US012755441B2

(12) United States Patent
Zakharchenko et al.

(10) Patent No.: US 12,755,441 B2
(45) Date of Patent: Oct. 6, 2026

(54) DECODING METHOD, ENCODING METHOD, BITSTREAM, DECODER, ENCODER AND STORAGE MEDIUM

(71) Applicant: GUANGDONG OPPO MOBILE TELECOMMUNICATIONS CORP., LTD., Dongguan (CN)

(72) Inventors: Vladyslav Zakharchenko, Dongguan (CN); Yue Yu, Dongguan (CN); Haoping Yu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/347,527

(22) Filed: Oct. 1, 2025

(65) Prior Publication Data

US 2026/0087676 A1 Mar. 26, 2026

Related U.S. Application Data

(63) Continuation of application No. PCT/CN2024/087325, filed on Apr. 11, 2024.

(60) Provisional application No. 63/458,889, filed on Apr. 12, 2023.

(51) Int. Cl.
*G06T 9/00* (2006.01)
*G06T 9/20* (2006.01)

(52) U.S. Cl.
CPC ................ *G06T 9/001* (2013.01); *G06T 9/20* (2013.01)

(58) Field of Classification Search
None
See application file for complete search history.

(56) References Cited

U.S. PATENT DOCUMENTS 6,738,062 B1 * 5/2004 Moreton ................. G06T 17/20 345/423
2020/0202624 A1 * 6/2020 Szasz ......................... G06T 7/60
2022/0060529 A1 * 2/2022 Oh ....................... H04N 13/194
(Continued)

OTHER PUBLICATIONS

International Search Report and Written Opinion in International application No. PCT/CN2024/087325, mailed on Jun. 14, 2024.
(Continued)

*Primary Examiner* — Leon Viet Q Nguyen
(74) *Attorney, Agent, or Firm* — Ladas & Parry, LLP

(57) ABSTRACT

A decoding method, encoding method, bitstream, decoder, encoder and storage medium are disclosed. The decoding method includes that: a bitstream is parsed to determine a reconstructed base mesh of a current image, displacement coefficients and a value of first syntax identification information, the reconstructed base mesh is reconstructed based on an original mesh of the current image; a subdivided mesh is determined according to the reconstructed base mesh; and when the value of first syntax identification information represents single component displacement coding, the displacement coefficients are applied to subdivision points in the subdivided mesh in a dimension of a specific vector to obtain a reconstructed mesh, the specific vector includes a normal vector, a tangent vector or a bitangent vector, and the displacement coefficients are determined in the dimension of the specific vector by fitting the original mesh and the subdivided mesh in the dimension of the specific vector.

20 Claims, 20 Drawing Sheets

(56) References Cited

U.S. PATENT DOCUMENTS

| | | | | |
|---|---|---|---|---|
| 2023/0290063 | A1* | 9/2023 | Mammou ............... | G06T 9/004 |
| 2024/0205407 | A1* | 6/2024 | Tokumo .................. | G06T 9/001 |

OTHER PUBLICATIONS

Rowenhorst, D & Rollett, A.D. & Rohrer, G & Groeber, M & Jackson, M & Konijnenberg, Peter & Graef, M.. (2015), “Consistent representations of and conversions between 3D rotations”, Modelling and Simulation in Materials Science and Engineering, Modelling Simul. Mater. Sci. Eng. 23 (2015) 083501 (22pp) doi:10.1088/0965-0393/23/8/083501.

E. Faramarzi, R. Joshi and M. Budagavi, “Mesh Coding Extensions to MPEG-I V-PCC,” 2020 IEEE 22nd International Workshop on Multimedia Signal Processing (MMSP), 2020, pp. 1-5, doi: 10.1109/MMSP48831.2020.9287057.

J. Rossignac, “Edgebreaker: connectivity compression for triangle meshes,” in IEEE Transactions on Visualization and Computer Graphics, vol. 5, No. 1, pp. 47-61, Jan.-Mar. 1999, doi: 10.1109/2945.764870.

Mamou, Khaled & Zaharia, Titus & Prêteux, Françoise. (2009). TFAN: A low complexity 3D mesh compression algorithm. Journal of Visualization and Computer Animation. 20. 343-354.10.1002/cav.319.

ISO/IEC 23090-5:2021 (2E), “Information technology—Coded representation of immersive media—Part 5: Visual volumetric video-based coding (V3C) and video-based point cloud compression (V-PCC)”, section 6 and 9.

* cited by examiner

DECODING METHOD, ENCODING METHOD, BITSTREAM, DECODER, ENCODER AND STORAGE MEDIUM

CROSS-REFERENCE OF RELATED APPLICATION

This is a continuation application of International Patent Application No. PCT/CN2024/087325, filed on Apr. 11, 2024, which is based on and claims priority to U.S. Patent Application No. 63/458,889 filed on Apr. 12, 2023, the disclosures of which are hereby incorporated by reference in their entireties.

BACKGROUND

In the standard reference software of three-dimensional mesh coding provided by Moving Image Experts Group (MPEG), displacement coefficients are calculated based on a subdivided mesh, which is obtained through base mesh division, and an original mesh, and geometry is reconstructed according to the base mesh and displacement coefficients to restore a mesh.

For the calculation of displacement coefficients, the displacement coefficients between an original mesh and a subdivided mesh are calculated in three-dimensional domain at present. The displacement coefficients include the displacement values on three components corresponding to the three-dimensional domain. If single component displacement coding is adopted, displacement values on a specified component (e.g., a normal component) of the displacement coefficients are retained and the displacement values on the other two components are discarded. This method reduces the accuracy of displacement coefficients in the case of single component displacement coding, thus reducing the accuracy of encoder and decoder for mesh reconstruction, and thus reducing the encoding performance and decoding performance.

SUMMARY

The embodiments of the disclosure relate to the technical field of dynamic mesh encoding and decoding, and in particular, to a decoding method, encoding method, bitstream, decoder, encoder and storage medium.

The technical solutions of the embodiments of the present disclosure can be implemented as follows.

In a first aspect, there is provided a decoding method, performed by a decoder, including: determining a reconstructed base mesh of a current image, displacement coefficients and a value of first syntax identification information by parsing a bitstream, wherein the reconstructed base mesh is reconstructed based on an original mesh of the current image; determining a subdivided mesh according to the reconstructed base mesh; and when the value of the first syntax identification information represents single component displacement coding, applying the displacement coefficients to subdivision points in the subdivided mesh in a dimension of a specific vector to obtain a reconstructed mesh. Here, the specific vector includes one of a normal vector, a tangent vector, and a bitangent vector, and the displacement coefficients are determined in the dimension of the specific vector by fitting the original mesh of the current image and the subdivided mesh in the dimension of the specific vector.

In a second aspect, there is provided an encoding method, performed by an encoder, including: determining a reconstructed base mesh of a current image according to an original mesh of the current image; determining a subdivided mesh corresponding to the reconstructed base mesh and determining a value of first grammar identification information; when the value of the first syntax identification information represents single component displacement coding, determining displacement coefficients corresponding to a dimension of a specific vector by fitting the original mesh and the subdivided mesh in the dimension of the specific vector; and encoding the displacement coefficients to obtain encoded bits and writing the encoded bits into a bitstream. Here, the specific vector includes one of a normal vector, a tangent vector, and a bitangent vector.

In a third aspect, there is provided a decoder including a processor and a memory for storing a computer program executable for the processor. The processor is configured to: parse a bitstream to determine a reconstructed base mesh of a current image, displacement coefficients and a value of first syntax identification information, wherein the reconstructed base mesh is reconstructed based on an original mesh of the current image; determine a subdivided mesh according to the base mesh; and apply the displacement coefficients to subdivision points in the subdivided mesh in a dimension of a specific vector to obtain a reconstructed mesh when the value of the first syntax identification information represents single component displacement coding. Here, the specific vector includes one of a normal vector, a tangent vector, and a bitangent vector, and the displacement coefficients are determined in the dimension of the specific vector by fitting the original mesh of the current image and the subdivided mesh in the dimension of the specific vector.

DETAILED DESCRIPTION

Figure 1A:
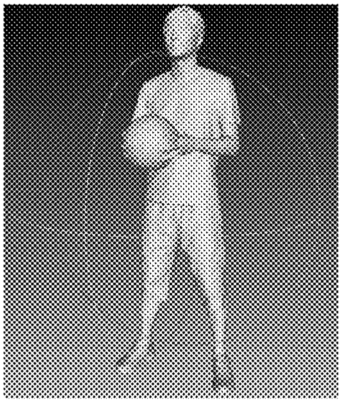
FIG. 1A is a schematic diagram of a three-dimensional mesh image.

In order to have a more detailed understanding of the features and technical contents of the embodiments of the present disclosure, implementations of the embodiments of the present disclosure will be described in detail below in conjunction with the accompanying drawings, which are for reference only and are not intended to limit the embodiments of the present disclosure.

Unless otherwise defined, all technical and scientific terms used herein have the same meaning as would normally be understood by those skilled in the art of the present disclosure. The terminology used herein is for the purpose of describing embodiments of the application only, and is not intended to limit the present disclosure.

In the following description, reference is made to "some embodiments" that describe a subset of all possible embodiments, but it is understood that "some embodiments" may be the same subset or different subsets of all possible embodiments, and may be combined with each other without conflict.

It should also be noted that the term "first/second/third" referred to in embodiments of the present disclosure is used only to distinguish similar objects and does not represent a particular order for objects, and it is understood that "first/second/third" may be interchanged in a particular order or priority order where permissible to enable embodiments of the present disclosure described herein to be implemented in an order other than that illustrated or described herein.

Key Terms of Three-Dimensional Dynamic Mesh

Mesh—a collection of vertices, edges, and faces that define the shape/topology of a polyhedral object. The faces usually consist of triangles (triangle mesh).

Base mesh—a mesh with fewer vertexes but preserves similarity to the original surface.

Dynamic mesh—a mesh with at least one of the five components (Connectivity, Geometry, Mapping, Vertex Attribute, and Attribute Map) varying in time.

Animated mesh—a dynamic mesh with constant connectivity.

Parameterized mesh—a mesh with the topology defined as the mapping component.

Connectivity—a set of vertex indices describing how to connect the mesh vertices to create a three-dimensional surface. (Geometry and all the attributes share the same unique connectivity information).

Geometry—a set of vertex three-dimensional (x, y, z) coordinates describing positions associated with the mesh vertices. The (x, y, z) coordinates representing the positions should have finite precision and dynamic range.

Mapping—a description of how to map the mesh surface to a two-dimensional region for the surface. Such mapping is described by a set of UV parametric/texture [mapping] coordinates associated with the mesh vertices together with the connectivity information.

Vertex attribute—a scalar of vector attribute values associated with the mesh vertices.

Attribute Map—attributes associated with the mesh surface and stored as two-dimensional images/videos. The mapping between the videos (i.e., parametric space) and the surface is defined by the mapping information.

Vertex—a position (usually in three-dimensional space) along with other information such as color, normal vector, and texture coordinates.

Edge—a connection between two vertices.

Face—a closed set of edges in which a triangle face has three edges defined by three vertices. Orientation of the face is determined using a "right-hand" coordinate system.

Surface—a collection of faces that separates the three-dimensional object from the environment.

bpp—bits per point, an amount of information in terms of bits required to describe one point in the mesh.

Displacement—the difference between the original mesh geometry and the mesh geometry reconstructed due to the base mesh subdivision process.

Level of details (LoD)—scalable representation of mesh reconstruction, each level of detail contains enough information to reconstruct mesh to an indicated precision or spatial resolution. Each following level of details is a refinement on top of the plurality of previously reconstructed mesh.

It should be noted that bitstreams in different data formats can be decoded and synthesized in the same video scene, which may include at least image format, point cloud format and mesh format. In this way, real-time immersive video interaction services can be provided for multiple data formats (e.g., mesh, point cloud, image, etc.) with different sources.

In embodiments of the present disclosure, the data-format-based approach may allow independent processing at the bitstream level of the data format. That is, like tiles or slices in video encoding, different data formats in the scene can be encoded in an independent manner, so that independent encoding and decoding can be performed based on the data format.

Generally speaking, three-dimensional (3D) animation content is represented based on key frames. That is, each frame is a static mesh. Static meshes at different times have the same topology and different geometries. However, the data volume of the three-dimensional dynamic mesh based on key frame representation is very large. Therefore, effective storage, transmission and rendering have become a problem to be solved during development of the three-dimensional dynamic mesh. In addition, in order to adapt to different user terminals (computers, notebooks, portable devices, mobile phones), it is necessary to support the spatial scalability of the mesh; and in order to adapt to different network bandwidths (broadband, narrowband, wireless), it is necessary to support the quality scalability of the mesh. Therefore, three-dimensional dynamic mesh compression is a critical problem.

Figure 1B:
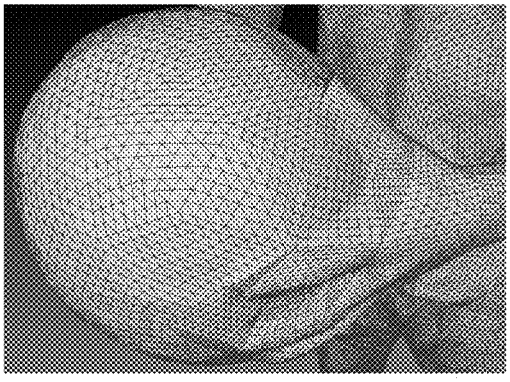
FIG. 1B is a partially enlarged schematic diagram of a three-dimensional mesh image.

A three-dimensional mesh is a three-dimensional object surface composed of countless polygons in space, and the polygons are composed of vertices and edges. FIG. 1A shows a three-dimensional mesh image, and FIG. 1B shows a local enlarged schematic diagram of the three-dimensional mesh image. According to FIGS. 1A and 1B, it can be seen that the mesh surface is composed of closed polygons.

Figure 2:
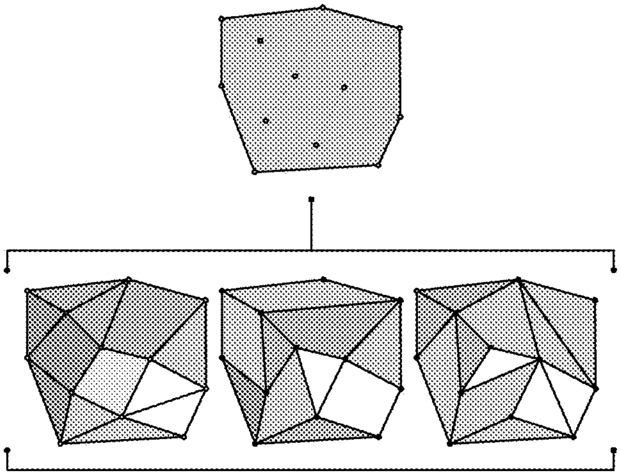
FIG. 2 is a schematic diagram of the connectivity of a three-dimensional mesh.

A two-dimensional image has information expressions at respective pixels which are distributed regularly, and thus it is not necessary to record their position information additionally. However, the distribution of vertices in the mesh in three-dimensional space is random and irregular, and the composition of polygons needs additional regulations. Therefore, it is necessary to record the position of each vertex in space and the connectivity of each polygon in order to completely express a mesh image. As shown in FIG. 2, the same number and position of vertices have completely different surfaces due to different connection manners.

In addition to the above information, because the three-dimensional mesh image is usually encoded by the existing two-dimensional image/video coding method, it is necessary to transform the three-dimensional mesh from three-dimensional space to two-dimensional image, and UV coordinates define the transform process.

Similar to two-dimensional images, each position may have corresponding attribute information in the acquisition process, usually RGB color value, which reflects the color of an object. For a three-dimensional mesh, in addition to color, the attribute information corresponding to each vertex includes reflectivity, which reflects the surface material of the object. The attribute information of three-dimensional mesh is stored through two-dimensional images, and the mapping from two-dimensional to three-dimensional is defined by UV coordinates.

Thus, three-dimensional mesh data usually includes three-dimensional geometry (x, y, z), connectivity information, UV coordinates, and attribute map.

Connectivity information is used to describe how to connect mesh vertices to create a set of vertex indexes of three-dimensional surface. For example, the connectivity information may include a triangular face connectivity of geometry information, a connectivity of texture information and the like. Geometry and all attributes share the same unique connectivity.

Connectivity information is represented in current mesh coding solutions in absolute values with the associated vertex indexes. The information is explicitly coded with entropy coding sequentially. Such an approach creates a process that allows limited flexibility and efficiency for information coding. The information being coded is mixed, which leads to a significant entropy increase.

Figure 3:
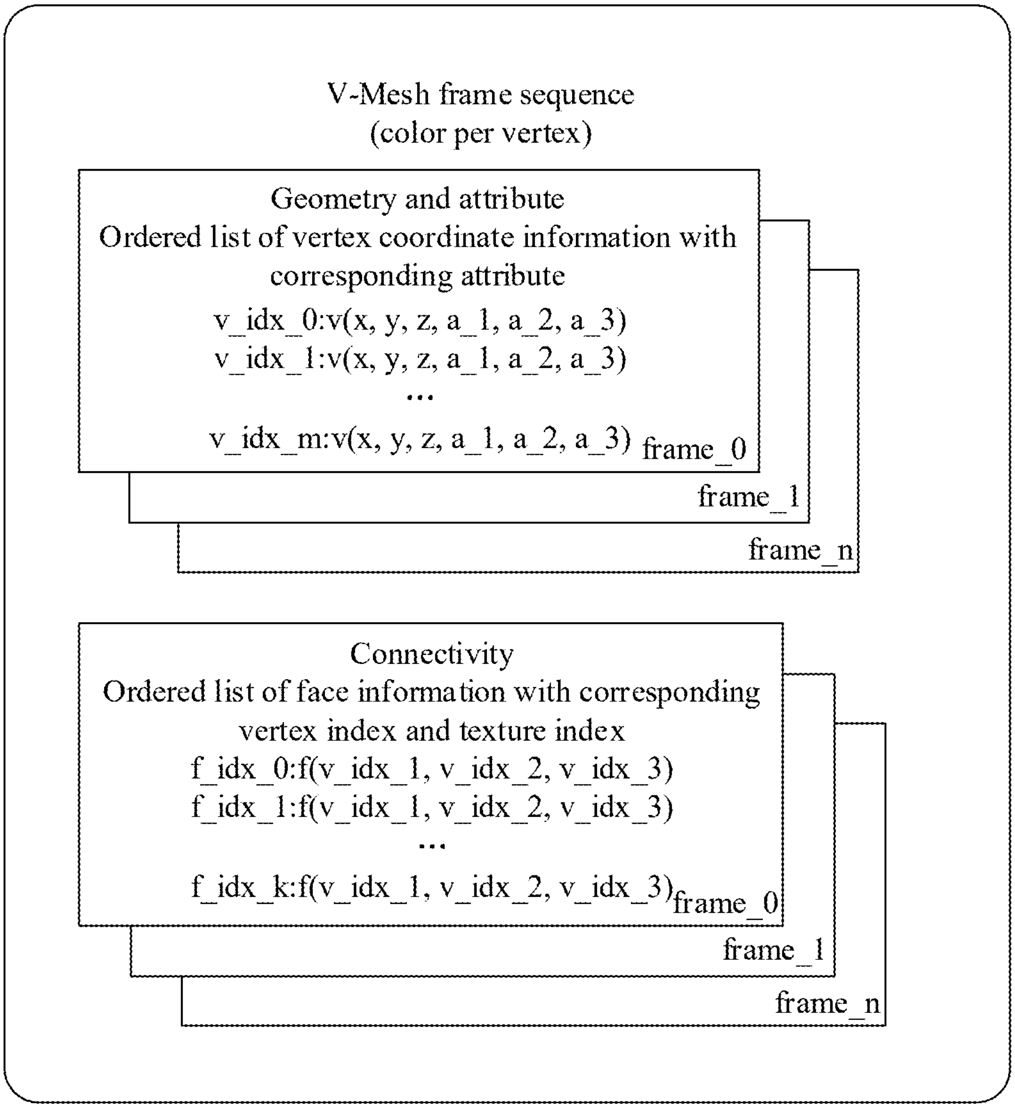
FIG. 3 is a schematic diagram of a data structure for a mesh with attributes per vertex in a mesh frame.
Figure 4A:
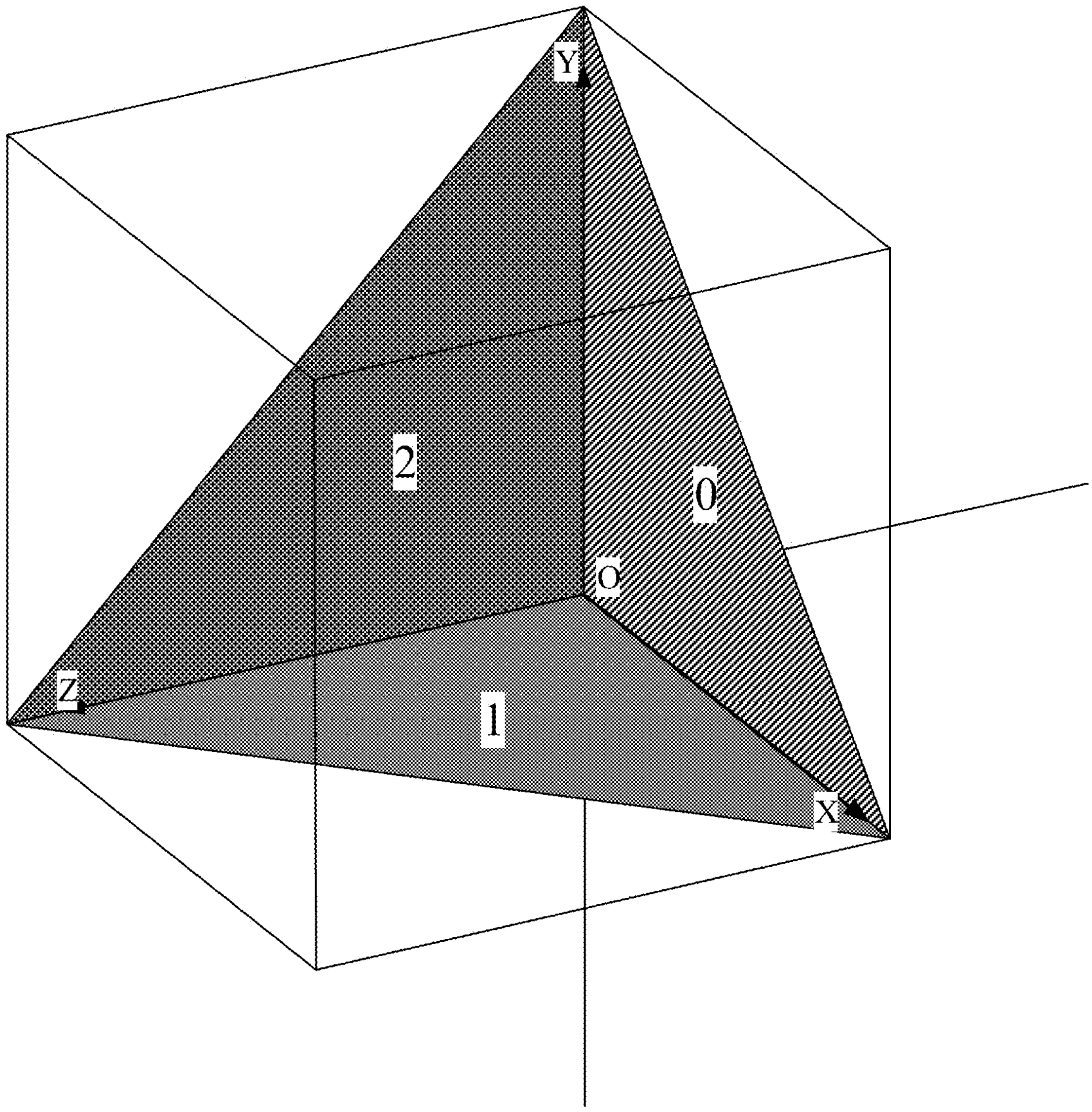
FIG. 4A is a schematic diagram of a surface represented by a mesh with color characteristics per vertex.
Figure 4B:
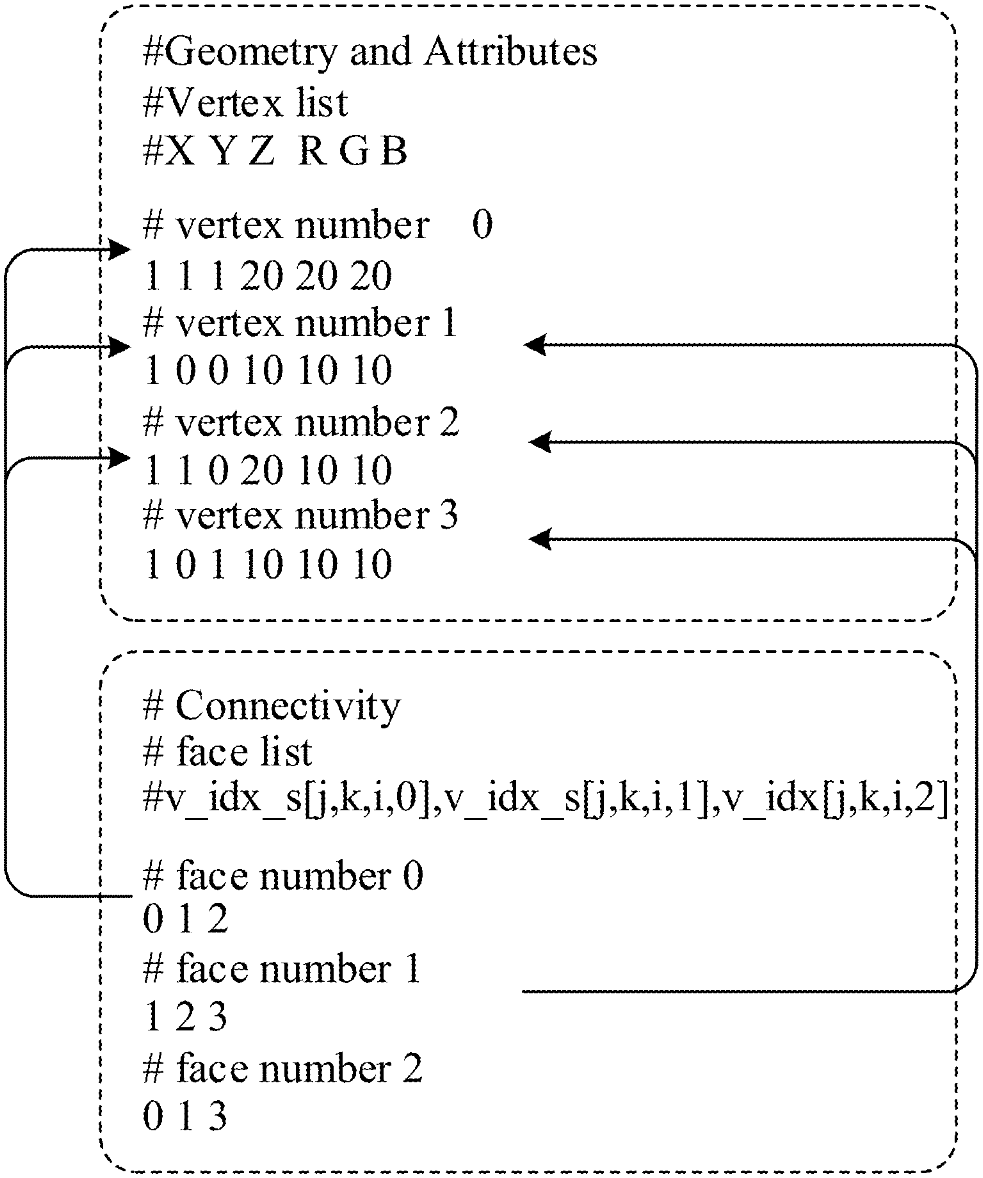
FIG. 4B is a schematic diagram of a data structure for a mesh with color characteristics per vertex.

Connectivity information is utilizing a unique vertex index combination method for representing the topography of a mesh. The data size for connectivity information in current solutions is approximately 16~20 bits per index; thus, each face is represented by a 48~60-bit value. FIG. 3 is a schematic diagram of a data structure for a mesh with attributes per vertex in a mesh frame, and the data structure includes connectivity information. FIG. 4A is a schematic diagram of a surface represented by a mesh with color characteristics per vertex. The data structure of the mesh is shown in FIG. 4B. The mesh consists of four vertices and three faces, and each face is defined by three vertex indices that form a triangle. A position in space describes each vertex by X, Y, Z coordinates and color attributes R, G, B, as shown below.

```
# ---------------------------------
# Part 1 :
#   geometry information
#      X   Y   Z   a_1   a_2   a_3
#   vertex   0 (v_idx_0)
v      0.0 0.0 0.0 127 127 127
#   vertex 1 (v_idx_1)
v      1.0 0.0 0.0 127 127 127
#   vertex 2 (v_idx_2)
v      0.0 1.0 0.0 127 127 127
#   vertex 3 (v_idx_3)
v      0.0 0.0 1.0 127 127 127
# ---------------------------------
# Part 2 :
#   connectivity information
# v_idx, v_idx, v_idx
# face 0 (f_idx_0)
f      0   1   2
# face 1 (f_idx_1)
f      0   3   1
# face 2 (f_idx_2)
f      0   2   3
# ---------------------------------
```

Figure 5A:
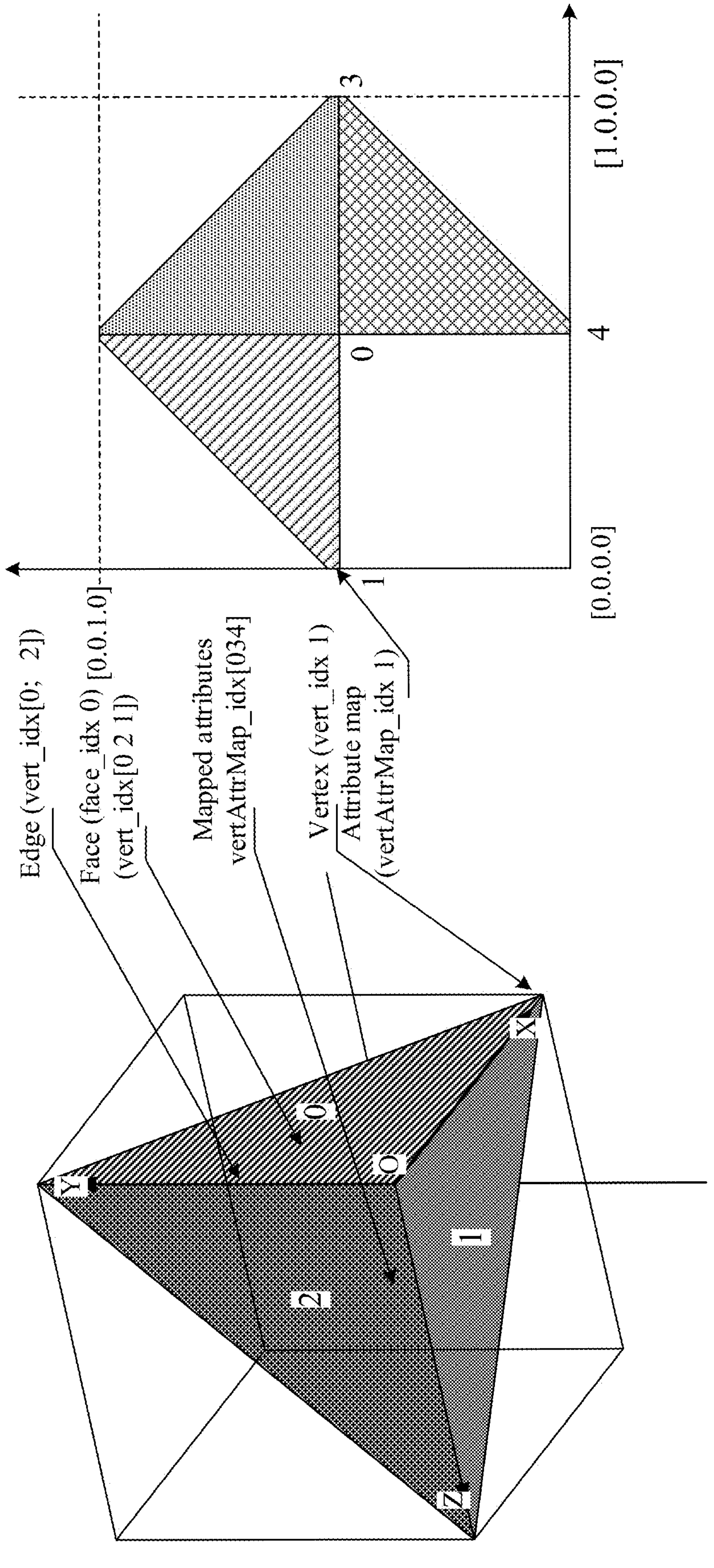
FIG. 5A is a schematic diagram of a surface represented by a mesh with attribute mapping characteristics.
Figure 5B:
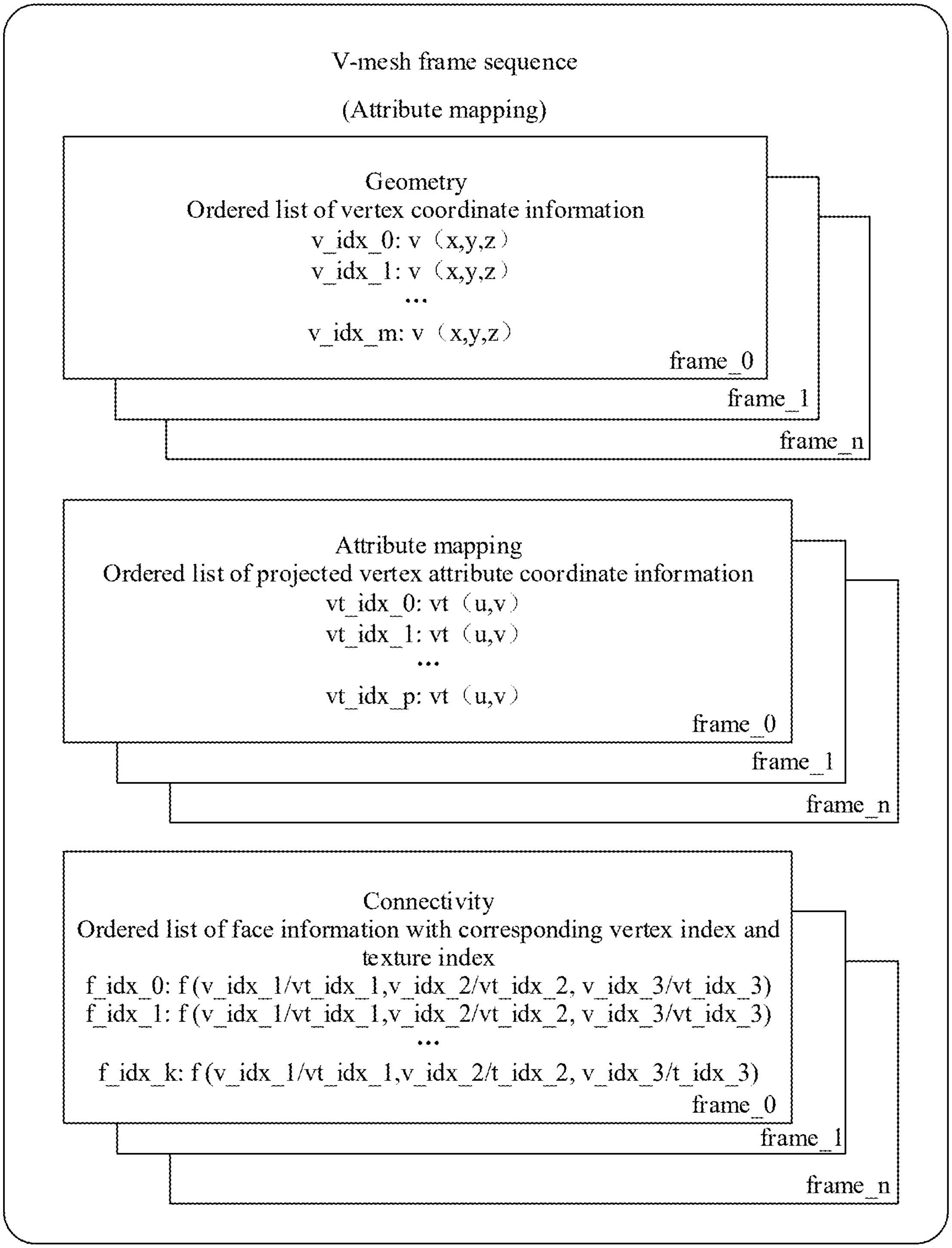
FIG. 5B is a schematic diagram of a data structure for a mesh with attribute mapping characteristics.

For example, FIG. 5A shows an example of a surface represented by a mesh with attribute mapping characteristics. A data structure for a mesh with attribute mapping characteristics is shown in FIG. 5B. As can be seen, the mesh consists of four vertices and three faces. A position in space describes each vertex by X, Y, Z coordinates. Attribute coordinates in the two-dimensional texture vertex map are denoted by U and V. Each face is defined by three pairs of vertex indices and texture vertex coordinates forming a triangle in three-dimensional space and a triangle in the two-dimensional texture map.

```
# ---------------------------------
# Part 1 :
#   geometry information
#   X   Y   Z
# vertex 0 (v_idx_0)
v   0.0 0.0 0.0
# vertex 1 (v_idx_1)
v   1.0 0.0 0.0
# vertex 2 (v_idx_2)
v   0.0 1.0 0.0
# vertex 3 (v_idx_3)
v   0.0 0.0 1.0
# ---------------------------------
# Part 2 :
#   mapping information
#   U   V
#   texture vertex 0 (vt_0)
vt 0.500000 0.500000
#   texture vertex 1 (vt_1)
vt 0.000000 0.500000
#   texture vertex 2 (vt_2)
vt 0.500000 1.000000
#   texture vertex 3 (vt_3)
vt 1.000000 0.500000
#   texture vertex 4 (vt_4)
vt 0.500000 0.000000
# ---------------------------------
# Part 3 :
#   connectivity information
#   v_idx / vt_idx
# face 0 (f_idx_0)
f   0/0 1/2 2/1
# face 1 (f_idx_1)
f   0/0 3/2 1/3
# face 2 (f_idx_2)
f   0/0 2/3 3/4
```

Figure 6:
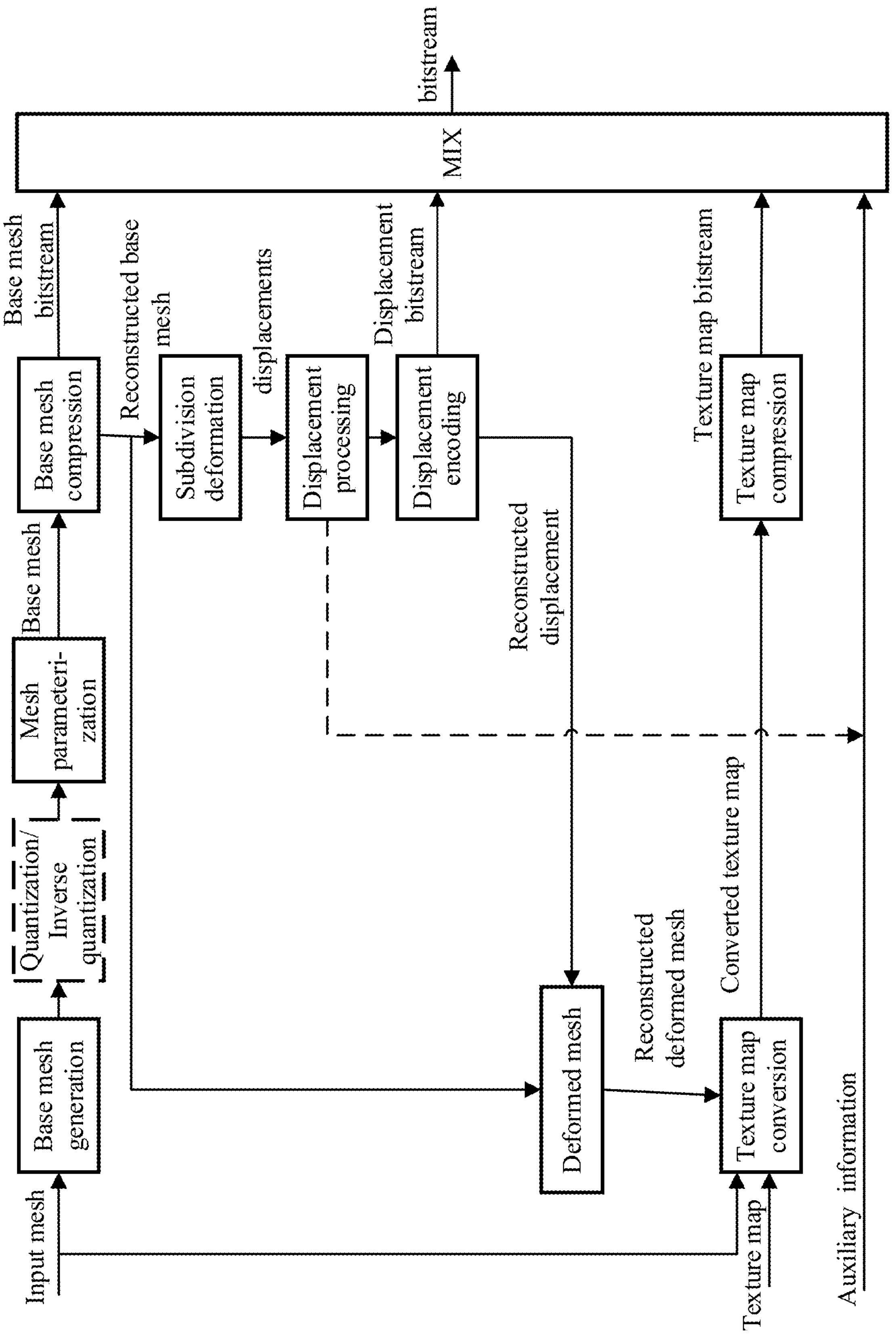
FIG. 6 is a schematic diagram of a three-dimensional mesh coding framework based on subdivision deformation.

In the dynamic mesh coding provided by the Moving Picture Experts Group (MPEG), for example, as shown in FIG. 6, FIG. 6 is a schematic diagram of a three-dimensional mesh coding framework based on subdivision deformation. The input mesh passes through a base mesh generation module to obtain the base mesh with fewer points and faces, and then parameterize the base mesh to generate texture coordinates for the base mesh. Then, the base mesh encoder is used to encode the base mesh to get the base mesh bitstream and reconstruct the base mesh. The reconstructed base mesh is subdivided and deformed to obtain the displacement corresponding to the reconstructed mesh. Then the displacements are processed, including transform, quantization and so on. Then the processed displacements are coded and reconstructed, and the reconstructed meshes are obtained by using the reconstructed displacements and the reconstructed base meshes. Then the texture map is converted according to the reconstructed mesh to get a corresponding texture map, and the texture map is coded to get the texture map bitstream. The relevant encoding information needed by the decoder is transmitted to the decoder through auxiliary information.

Figure 7:
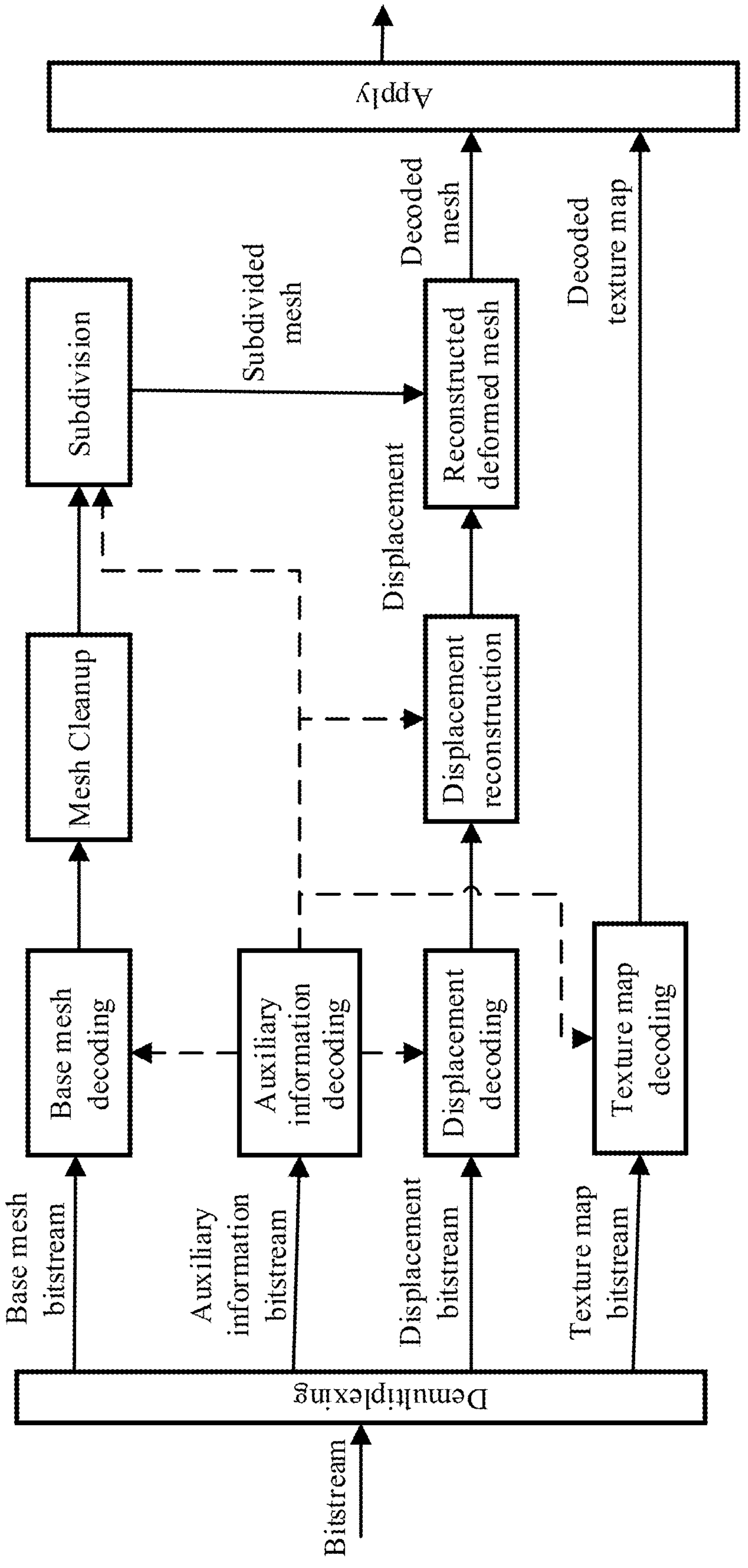
FIG. 7 is a schematic diagram of a three-dimensional mesh decoding framework based on subdivision deformation.

FIG. 7 is a schematic diagram of a three-dimensional mesh decoding framework based on subdivision deformation. After decoding the auxiliary information, the decoded patch information guides each module to decode according to a preset mode of the encoding end. The base mesh bitstream is decoded by a base mesh decoder corresponding to the encoding end. A mesh cleanup step is carried out on the decoded base mesh, that is, repetitive points and degraded surfaces (surfaces with an area of 0) are removed. The displacement bitstream is decoded by a displacement decoding module, and then the displacements are reconstructed, including inverse transform, inverse quantization and other steps. Then, the reconstructed displacements are applied to a subdivided base mesh (subdivided mesh) to obtain a reconstructed mesh. The texture map bitstream is decoded to obtain a reconstructed texture map.

Next, the geometry information coding of mesh will be described in detail.

1. Mesh Pre-Processing.
   A) Firstly, an original mesh is down-sampled to generate a decimated mesh (also referred to as a base mesh) with greatly reduced vertices. There are a lot of points in the connectivity of the original mesh. Before encoding the geometry information of the mesh, the geometry information of the mesh is quantized or simplified to obtain a corresponding base mesh.
2. Base Mesh Coding.
   a) After the base mesh is obtained, the geometry information of the base mesh is encoded by Dynamic Range Arithmetic Coding (DRACO). Here, geometry information mainly includes: position information (geometry and texture) coding and connectivity information coding. The whole process of DRACO is as follows: firstly, the connectivity information is encoded, secondly, the geometry position information of points is encoded based on the connectivity information, and finally, the texture position information is encoded based on the connectivity information and geometry position information.
   b) Connectivity information coding.

Figure 8A:
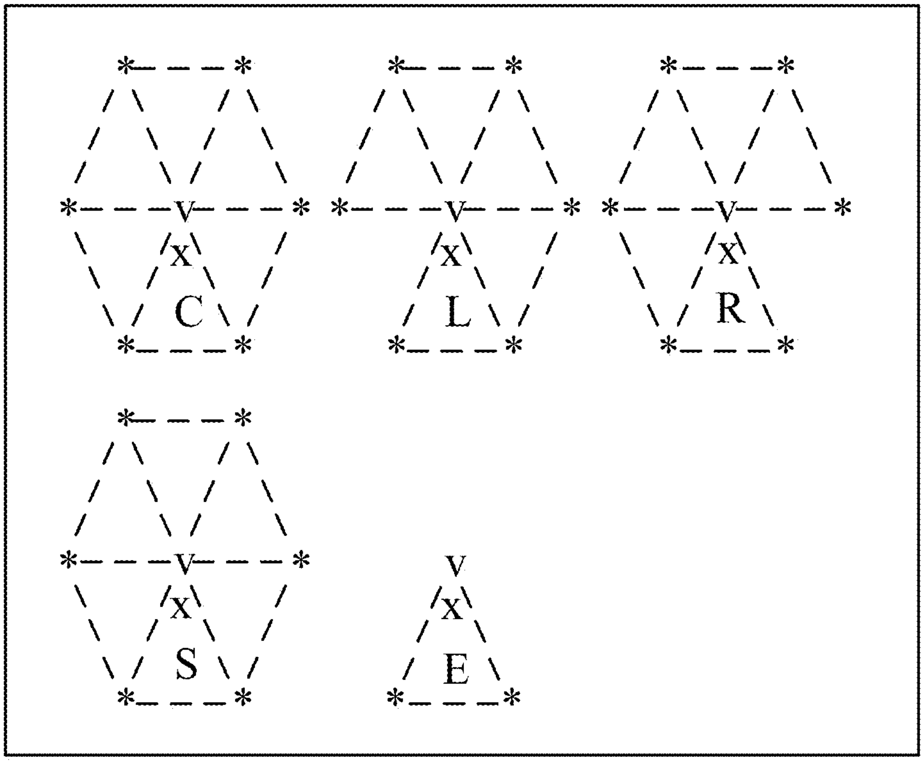
FIG. 8A is a schematic diagram of encoding of connectivity information of triangular faces.

To encode connectivity information, the triangular faces of the mesh are traversed in a deterministic, spiral-like way, so that:

1. Each new triangular face is next to an already encoded triangular face. This allows efficient compression of vertex coordinates and other attributes such as normals.
2. Attributes such as coordinates and normals of a vertex are predicted from an adjacent triangular face using parallelogram prediction and only stored as the difference between predicted and original values.
3. Each triangular face is encoded using minimum information to reconstruct mesh connectivity from the sequence. For simple meshes, each and every vertex of the triangular face is coded using one of the five configuration symbols “C”, “L”, “E”, “R”, and “S” demonstrated in FIG. 8A. In FIG. 8A, v denotes a current vertex. The five configuration symbols “C”, “L”, “E”, “R”, and “S” represents the following physical meanings.

C: None of the triangular faces connected with the current vertex has been encoded.

L: The left triangular face connected with the current vertex has been encoded.

R: The right triangular face connected with the current vertex has been encoded.

S: The left and right triangular faces connected with the current vertex have not been encoded.

E: Both the left and right triangular faces connected to the current vertex have been encoded.

Figure 8B:
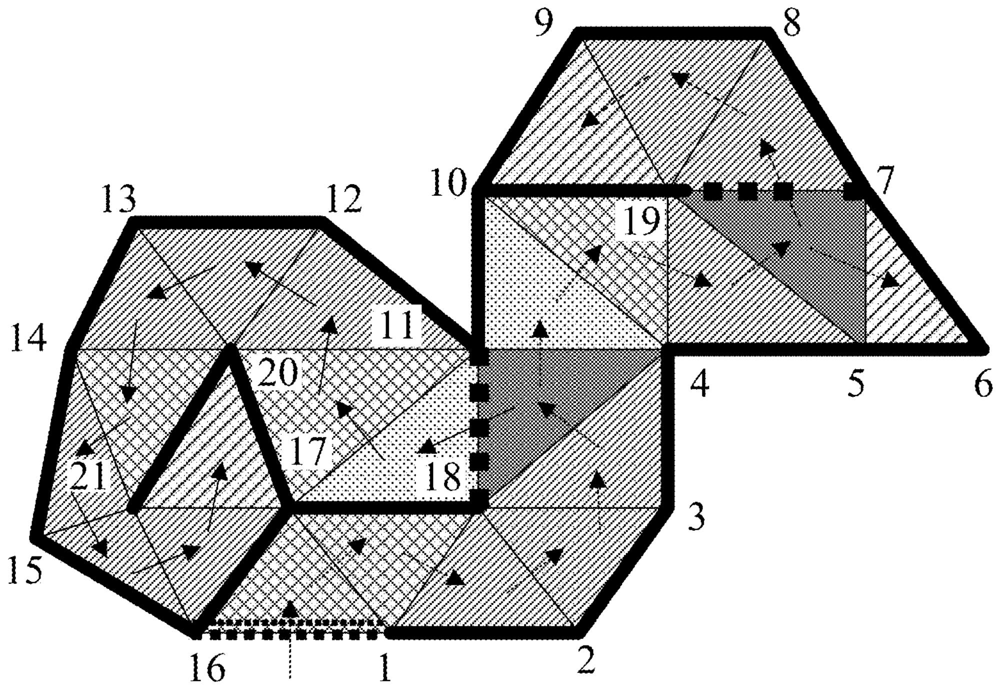
FIG. 8B is a second schematic diagram of encoding of connectivity information of triangular faces.

For example, according to the types of the vertices described above, connectivity information of the mesh shown in FIG. 8B may be expressed as “CCRRRSLCRSERRELCRRRRRE”. In this way, the type and processing order of each vertex can be encoded in a certain order, and the decoder can restore the geometry connectivity of mesh according to the processing order and type of vertex.

For example, typical data rates for information in mesh content with a color per-vertex data comprise approximately 170 bpp, with 60 bpp allocated for the connectivity information.

c) Coding of geometry. After coding of vertex connectivity information, the geometry of each vertex is predictively coded based on the vertex connectivity information. The idea of predictive coding is "Parallelograms algorithm", which uses three vertices (left vertex, right vertex and opposite vertex) adjacent to the current vertex to carry out simple linear fitting to predictively code the geometry information of the current vertex.

d) After coding the point connectivity information and geometry, the texture coordinates are predictive coded based on the decoding and reconstruction of the point connectivity information and geometry. Similarly, the left vertex and the right vertex of the current vertex can be obtained according to connectivity of the points, and then the texture coordinates of the current vertex can be predictive coded by using the texture coordinates of the left vertex and the right vertex.

3. Coding of Displacement Coefficients.

a) Firstly, after the coding and reconstruction of the base mesh, a certain partitioning algorithm will be used to partition the reconstructed base mesh, and newly generated vertices will be inserted on the edge of the reconstructed base mesh to obtain subdivided mesh.

b) Secondly, for each vertex in the subdivided mesh, the nearest vertex in the original mesh is searched, and the vector between the vertex in the subdivided mesh and the nearest vertex in the original mesh is a displacement coefficient. As long as the subdivision algorithm and the number of subdivision iterations are determined, the subdivided mesh can be automatically generated at an encoding end and a decoding end. Thus, after preprocessing, the original mesh only needs to be expressed as a simple base mesh and a series of displacement coefficients, which can greatly reduce the amount of data without affecting the reconstruction at the decoding end.

c) After calculating the displacement of each point, the spatial residual coefficient can be transformed into the frequency domain by Lifting Transform, to obtain a corresponding frequency residual coefficient.

d) Finally, the frequency domain residual coefficients of each point will be mapped to the two-dimensional image in a certain order by using the coefficient packing algorithm.

e) Eventually the traditional Video Codec is adopted to encode the two-dimensional image.

Figure 9:
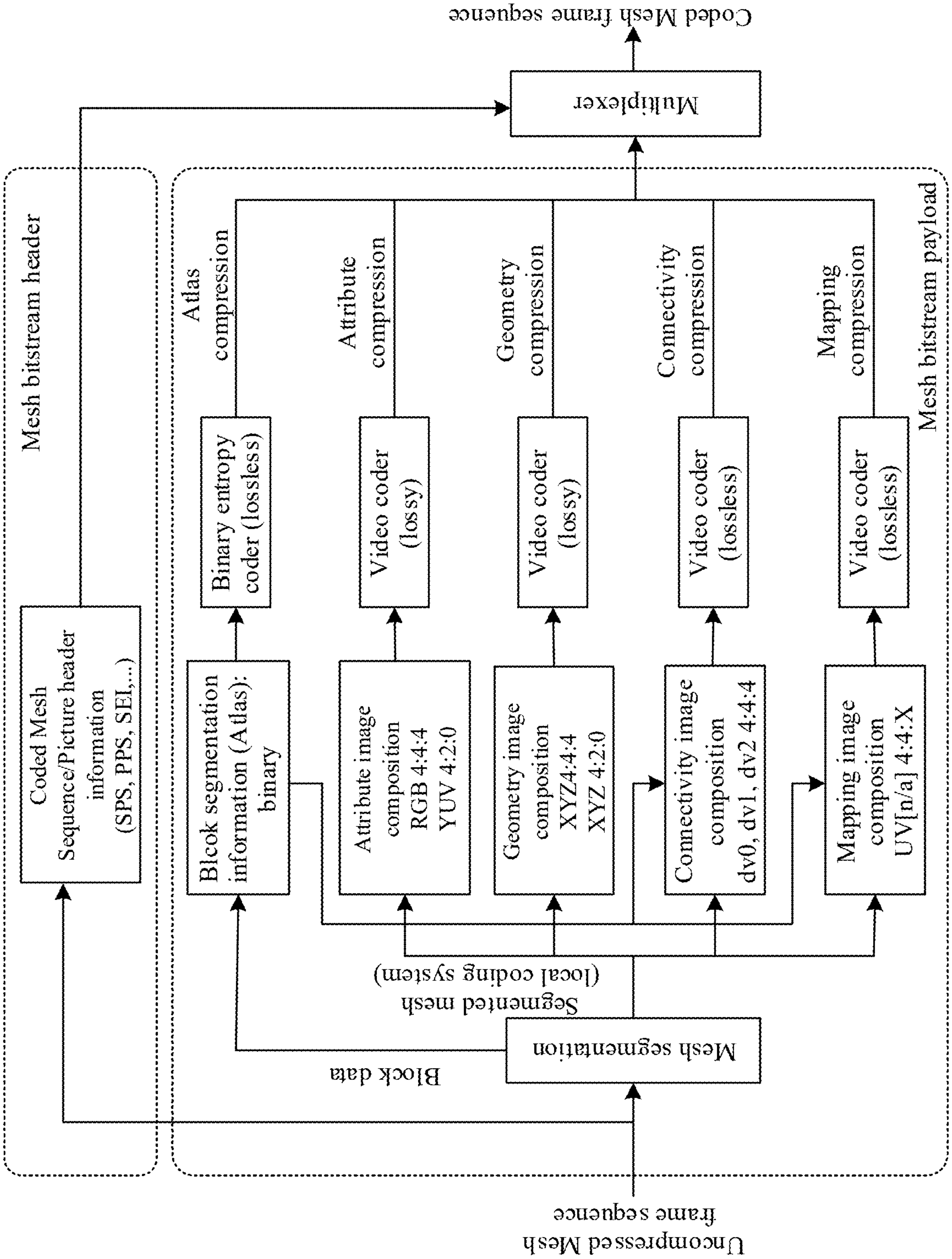
FIG. 9 is a schematic diagram of a generalized encoder structure for mesh encoding.

The generalized encoder structure of mesh coding can be shown in FIG. 9. To process a mesh frame, the segmentation process is applied for the global mesh frame, and all the information is coded in the form of three-dimensional blocks. In contrast, each block has a local coordinate system. The information used to convert the local coordinate system of the block to the global coordinate system of the mesh frame is carried in a block auxiliary information component (atlas component) of the coded mesh bitstream.

Based on the generalized encoder structure of FIG. 9, an approach to encode mesh information is by using a modified video-based point cloud compression (V-PCC) coding framework with modifications to encode connectivity information and optionally attribute (vertex) map. The main idea of V-PCC is to convert point cloud data from three-dimension to two-dimension, so that point cloud information can be encoded by two-dimensional video encoder. Projection-based (three-dimension to two-dimension) solutions can encode the geometry and attribute information of dynamic point clouds using existing high-performance two-dimensional video codecs such as High Efficiency Video Coding (HEVC), Versatile Video Coding (VVC) and Audio Video Interleaved (AVI).

The V-PCC coding process may be as follows. The encoder projects an original three-dimensional point cloud into a two-dimensional space with different angles through the patch generation process to generate patches. The patches are placed into two-dimensional video frames in sequence through patch packing, while keeping the tight position and direction of each patch between frames. The encoder uses the default patch generation and packing operations in V-PCC. The majority of points are segmented into regular patches, and the rest of the points that are not handled by the patch generation process are packed into raw patches, and then a patch substream is generated. Then, an occupancy map and a geometry map are generated, and an attribute map is generated using the same technology as that for the geometry map. Here, the occupancy map is a map representing the position information of vertices in the two-dimensional image. The value of a position having a projection of a vertex in the occupancy map is 1, and the values of other positions are 0. According to certain rules, patches are arranged in two-dimensional images, to generate an occupancy map. The distance from each vertex to the projection plane is stored in the geometry map. Depth information of each vertex can be calculated directly by using three-dimensional coordinates of vertices, projection plane for vertices and occupancy map, and then the geometry map can be generated. The encoder uses two-dimensional video encoder to encode an occupancy map and geometry map to obtain an occupancy map substream and a geometry substream. The attribute map is encoded by two-dimensional video encoder to obtain attribute substream. In the V-PCC encoder, the order of the reconstructed vertices, which are identical to the order of reconstructed vertices at the decoder, may be different from that in the input mesh. Therefore, before encoding the connectivity, the vertex indices need to be updated to follow the order of the reconstructed vertices. The next step is to encode the updated vertex indices. The encoded connectivity is added to the V-PCC bitstream. Both Edgebreaker and triangular fan-based compression (TFAN), which encode the connectivity losslessly, traverse the vertices in an order different from input vertices. Therefore, the encoder needs to signal (encode) the traversal order of the vertices in the mesh connectivity method, which is called the reordering information or vertex map. The vertex map is also encoded, e.g., using differential coding and entropy coding, and the encoded map is added to the V-PCC bitstream. Finally, the encoder packs an attribute substream, geometry substream, occupancy map substream, patch substream, connectivity substream and vertex map substream into a V-PCC bitstream through multiplexer.

Figure 10A:
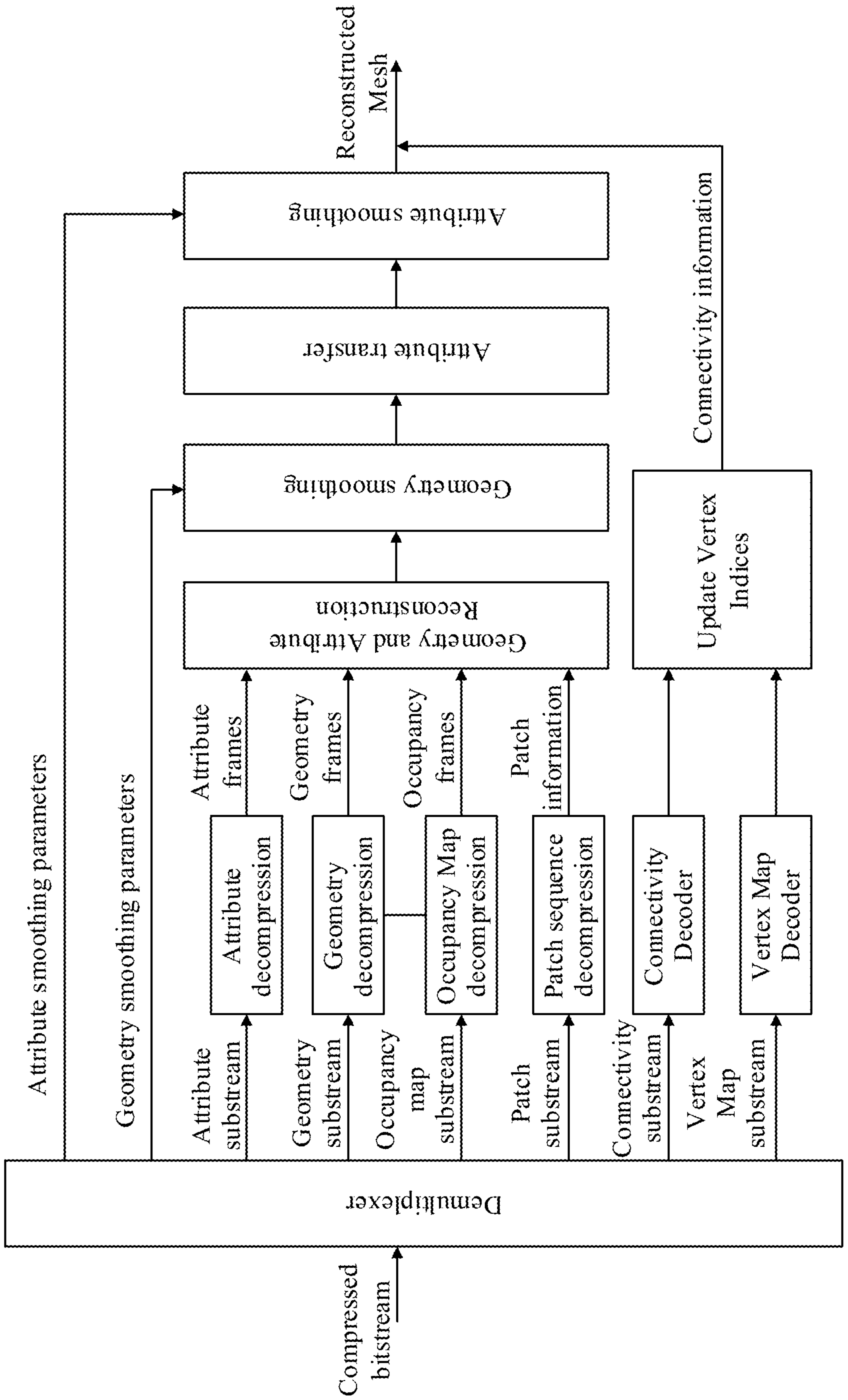
FIG. 10A is a flowchart of mesh information decoding based on attribute mapping.

At the decoder, as shown in FIG. 10A, the encoded connectivity substream and vertex map substream are extracted from the V-PCC bitstream and decoded, and a decoder for the connectivity decodes the connectivity substream to obtain decoded connectivity, and a decoder for the vertex map decodes the vertex map substream to obtain the vertex map. The vertex map is updated, and then the vertex map is applied to the decoded connectivity to align it with the order of the reconstructed vertices.

Figure 10B:
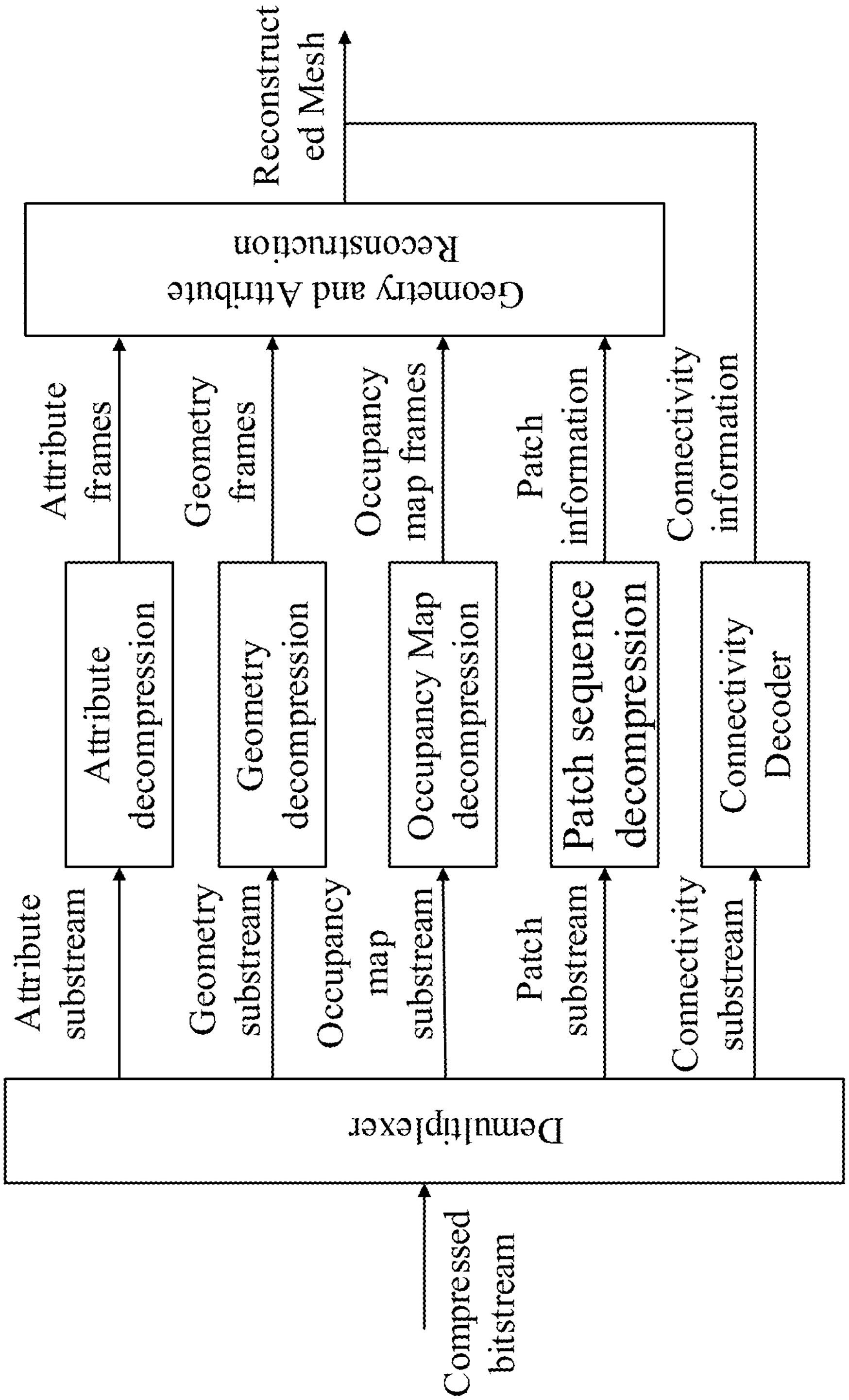
FIG. 10B is a schematic diagram of the vertex-by-vertex decoding process of mesh information of attribute mesh.

Similarly, the vertex map (or the reverse vertex map) can be applied to the reconstructed geometry and color attribute to align them with the decoded connectivity. In the case of color per-vertex attributes, the vertex map is not directly transferred, and the decoder is simplified to use only the connectivity information. In other words, the vertex map decoder and the module for updating the vertex index are not included, as shown in FIG. 10B.

To sum up, a three-dimensional mesh coding process in related art may include the following steps.

1. The original mesh is pre-processed by reducing the number of vertices in the mesh and simplifying connectivity, to obtain a base mesh.
2. Encoder such as Draco is used to quantify and encode the base mesh in Step 1, and a reconstructed base mesh is obtained by decoding and reconstructing.
3. The reconstructed base mesh obtained in Step 2 is subdivided. Specifically, a new point is added at the midpoint of the connecting line segment of any two vertices with connectivity in the reconstructed base mesh, and iterative subdivision is performed.
4. For each vertex in Step 2, the nearest point is searched in the original mesh, and a displacement coefficient of these two points is calculated in the three-dimensional domain.
5. Wavelet transform is performed on the displacement coefficient in the Step 4, and after the wavelet transform, the displacement coefficient is quantized to obtain a quantized transformed coefficient.
6. The quantized transformed coefficients are mapped from a three-dimensional space to a two-dimensional image (also referred to as "image packing") to generate a two-dimensional image for the displacement coefficients.
7. A standard video encoder such as H.265 is used to encode the two-dimensional image for the displacement coefficients in Step 6.

To sum up, a three-dimensional mesh decoding process in related art can be divided into the following steps.

1. The base mesh bitstream is decoded by a decoder such as DRACO to generate a decoded base mesh.
2. Displacement coefficients are decoded by a standard video encoder such as H.265 to obtain a two-dimensional image for the displacement coefficients.
3. The two-dimensional image for the displacement coefficients is mapped from a two-dimensional image to a three-dimensional space (also referred to as "image unpacking"), and quantized transformed coefficients are obtained.
4. Inverse quantization and inverse wavelet transform are applied to the quantized transformed coefficients to obtain the decoded displacement coefficients.
5. The decoded base mesh and the decoded displacement coefficients are combined to generate geometry information for reconstructing a three-dimensional mesh.
6. After the attribute bitstream is decoded by HEVC, the reconstructed attribute map is generated.

In related art, three-dimensional mesh coding mainly uses the subdivided mesh and the original mesh to calculate displacement coefficients, and then reconstructs and restores the geometry information for the mesh according to the base mesh and displacement coefficients. However, for the calculation of displacement coefficients, the displacement coefficients between original mesh and subdivided mesh are calculated in three-dimensional domain at present. The displacement coefficients include displacement values on three components corresponding to the three-dimensional domain. If a single component displacement coding is specified, i.e. a one-dimensional component is adopted to represent the displacement, the displacement values on the specified component (e.g. normal component) are selected from the displacement coefficients as the displacement coefficients on a specified component, and the displacement values on the other two components (e.g. tangent component and bitangent component) are discarded. This will lead to additional errors in position prediction, reducing accuracy of the displacement coefficients, and then reducing the accuracy of mesh reconstruction.

In view of the above, the embodiments of the present disclosure provide an encoding method and a decoding method. In the case of single component displacement coding, surface fitting and calculation of the displacement coefficients are performed on a single dimension of a designated component, such that the topology reconstruction can be improved by one-dimensional displacement coding using local coordinates, and the error of displacement coefficients can be minimized, the accuracy of displacement coefficients can be improved, and the accuracy of geometry information reconstruction can be improved, and the coding and decoding performance can be improved.

Figure 11:
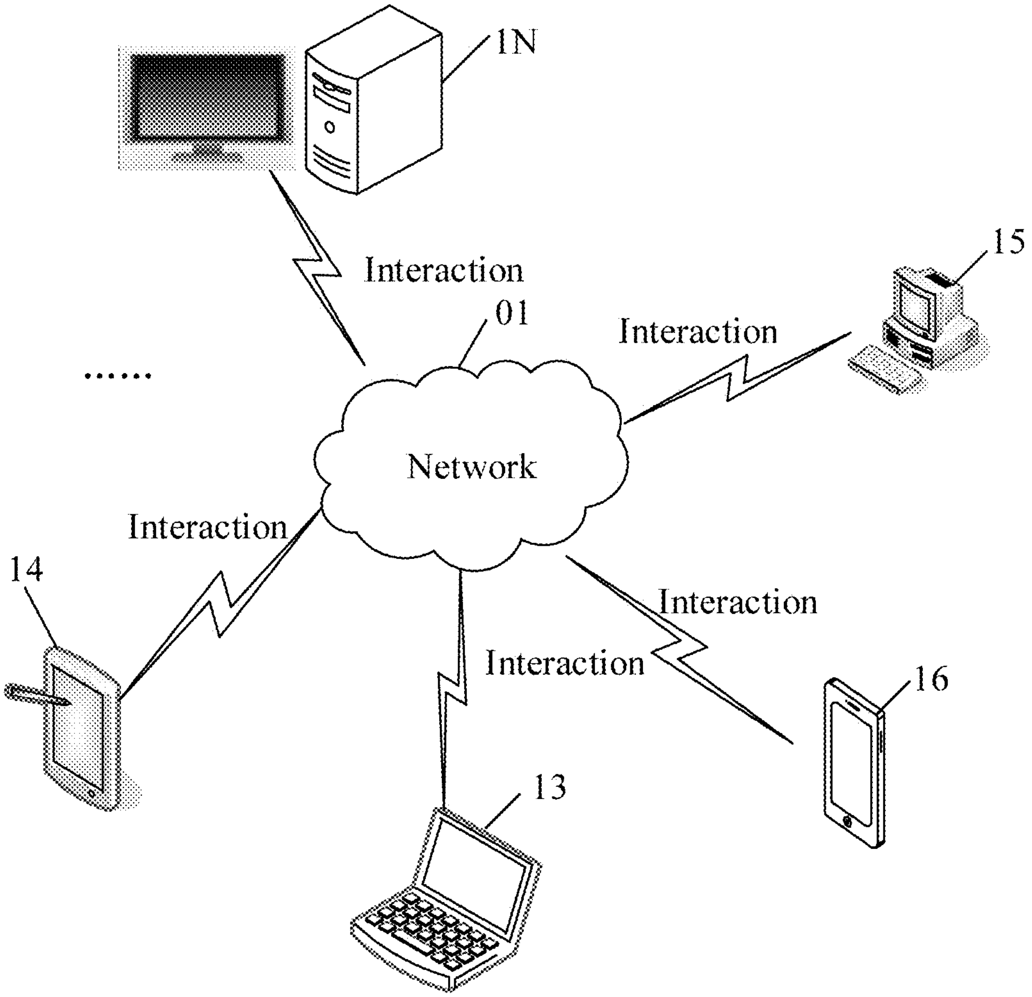
FIG. 11 is a schematic diagram of a mesh architecture of a codec provided by an embodiment of the present disclosure.

An embodiment of the present disclosure further provides a network architecture of a codec system implementing a decoding method and an encoding method. FIG. 11 is a schematic diagram of a network architecture for codec provided by an embodiment of the present disclosure. As shown in FIG. 11, the network architecture includes one or more electronic devices 13 to IN and a communication network 01 through which the electronic devices 13 to IN can interact video. The electronic device may be various types of devices having codec functions during implementation. For example, the electronic device may include a mobile phone, a tablet computer, a personal computer, a personal digital assistant, a navigator, a digital phone, a video phone, a television, a sensing device, a server, etc. The embodiments of the present disclosure are not specifically limited. Here, the decoder or encoder described in the embodiments of the present disclosure can be an electronic device.

Embodiments of the present disclosure will be described in detail below with reference to the accompanying drawings.

Figure 12:
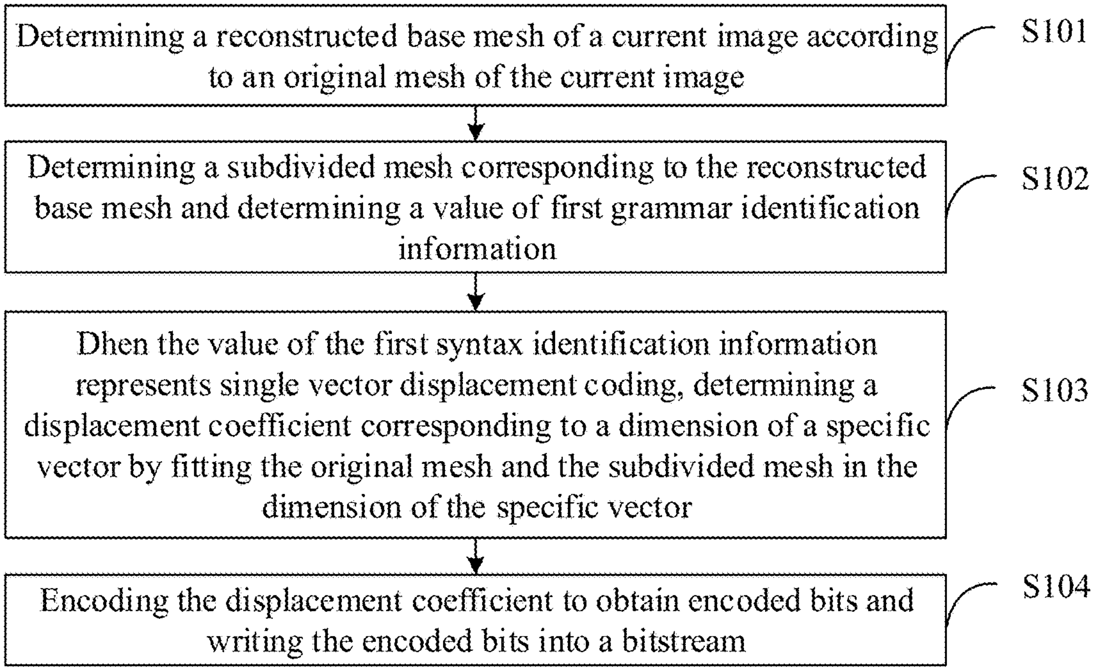
FIG. 12 is a flowchart of an encoding method provided by an embodiment of the present disclosure.

FIG. 12 shows a flowchart of an encoding method provided according to an embodiment of the present disclosure. As shown in FIG. 12, the method may include the following operations S101 to S104.

In S101, a reconstructed base mesh of a current image is determined from an original mesh of the current image.

It should be noted that the encoding method of the embodiment of the present disclosure may refer to an inter encoding method. More specifically, the encoding method of embodiments of the present disclosure may be an inter encoding method for displacement coefficients in a dynamic mesh. The encoding method can be applied to the encoder in V-DMC, but is not limited thereto.

It should also be noted that in the embodiments of the present disclosure, the base mesh can also be referred to as a "simplified mesh". In some embodiments, determining a base mesh of the current image from an original mesh of the current image may include subjecting the original mesh of the current image to a down-sampling process to determine a base mesh of the current image.

For example, firstly, the original mesh of the current image can be down-sampled to generate the base mesh with greatly reduced vertices. In addition, after the base mesh is obtained, the base mesh can be encoded, and the obtained encoded bits can be written into a bitstream.

For example, a dynamic mesh encoder (e.g. DRACO) may be used to encode the geometry information of the base mesh, and the resulting encoded bits may be written into the base mesh bitstream. The geometry information may include, for example, a connectivity and geometry information.

For example, the geometry information of the base mesh is encoded. The encoding process may include: encoding connectivity; encoding the geometry information of points based on connectivity of geometry positions; and encoding the texture position information based on connectivity and the geometry position information.

In some embodiments, the encoder performs geometry reconstruction on encoded information of the base mesh to determine a reconstructed base mesh of the current image.

In S102, a subdivided mesh corresponding to the reconstructed base mesh is determined, and a value of first syntax identification information is determined.

In an embodiment of the present disclosure, after obtaining the reconstructed base mesh, the reconstructed base mesh can be subdivided, and new vertices (i.e., subdivision points) are inserted on the edges of the reconstructed base mesh to determine a subdivided mesh.

In some embodiments, subdividing the reconstructed base mesh to determine a subdivided mesh may include: determining mesh subdivision parameters for the current image; the base mesh is iteratively subdivided according to the mesh subdivision parameters to determine the subdivided mesh of the current image.

In some embodiments, the mesh subdivision parameters may include, for example, a subdivision mode and a number of subdivision iterations. In addition, the subdivision mode and/or the number of subdivision iterations may be determined according to the syntax elements transmitted in the bitstream.

In some embodiments, the encoder can determine the value of the second syntax identification information according to the subdivision mode. The value of the second syntax identification information is encoded, and the obtained encoded bits are written into the bitstream. The value of the second syntax identification information indicates the decoder to subdivide the mesh in the same subdivision manner.

In some embodiments, the encoder may determine the value of the third syntax identification information based on the number of subdivision iterations. The value of the third syntax identification information is encoded, and the obtained encoded bits are written into the bitstream. The value of the third syntax identification information indicates the decoder to use the same number of subdivision iterations to subdivide the mesh.

It should be noted that in an embodiment of the present disclosure, the second syntax identification information and the third syntax identification information are a frame-level syntax element. By way of example, the second syntax identification information may indicate how a current frame is subdivided, the third syntax identification information may indicate the number of subdivision iterations of the current frame. In this way, the second syntax identification information may be represented by afve_subdivision_method, and the third syntax identification information may be represented by afve_subdivision_iteration count.

It should also be noted that in an embodiment of the present disclosure, the second syntax identification information and the third syntax identification information may or may not exist, which can be determined by using the value of a fourth syntax identification information. In some embodiments, the method may include determining the fourth syntax identification information. The value of the fourth syntax identification information is encoded, and the obtained encoded bits of the fourth syntax identification information is written into a bitstream.

In an embodiment of the present disclosure, the fourth syntax identification information may be also a frame-level syntax element. By way of example, the fourth syntax identification information may indicate whether there are second syntax identification information and third syntax identification information in a frame parameter set extension of the current image. As such, the fourth syntax identification information may be represented by afve_subdivision_enable_flag.

In an embodiment of the present disclosure, if the value of the fourth syntax identification information is a first value, it is determined that the fourth syntax identification information indicates there is second syntax identification information and third syntax identification information in the frame parameter set extension of the current image. If the value of the fourth syntax identification information is a second value, it is determined that the fourth syntax identification information indicates that there are no second syntax identification information and third syntax identification information in the frame parameter set extension of the current image.

In an embodiment of the present disclosure, the first value is different from the second value. Exemplarily, the first value may be set to 1 and the second value may be set to 0. Optionally, the first value may be set to 0 and the second value may be set to 1. Optionally, the first value may be set to true and the second value may be set to false. Optionally, the first value may be set to false, and the second value may be set to true.

In a specific embodiment, the first value may be 1 and the second value may be 0. That is, if there are parameters such as afve_subdivision_enable_flag, afve_geometry_coordinates_enable_flag in the frame parameter set extension of the current image, it can be determined that the value of afve_overriden_flag written in the bitstream is 1. If there are afve_subdivision_method and afve_subdivision_iteration_count in the frame parameter set extension of the current image, it can be determined that the value of afve_subdivision_enable_flag written in the bitstream is 1. If the afve_subdivision_method and afve_subdivision_iteration_count do not exist in the frame parameter set extension of the current image, then the value of afve_subdivision_enable_flag may not be written into the bitstream, in other words, if afve_subdivision_enable_flag does not exist in the bitstream, then it can be inferred that its value is equal to 0.

In some embodiments, the specific subdivision may include a number of ways such as midpoint subdivision Loop subdivision. For example, the subdivision algorithm may include an interpolation algorithm such as a linear interpolation algorithm or a nonlinear interpolation algorithm.

For example, for each of the edges in the reconstructed base mesh, a linear interpolation algorithm can be used for iterative subdivision to obtain a subdivided mesh. Here, the coordinate of the newly inserted point is obtained by linear interpolation based on two vertices on the current edge, as expressed in Formula (1):

$$pos_{new} = \frac{(pos_1 + pos_2)}{2} \tag{1}$$

where $pos_{new}$ is the coordinate of the newly inserted point, i.e., the subdivision point. $pos_1$ and $pos_2$ are geometry coordinates of vertices of the current edge participating in this iteration. $pos_{new}$ is a geometry coordinate of a vertex newly added in this iteration.

In an embodiment of the present disclosure, the first syntax identification information is used to represent the displacement coding mode. The displacement coding modes may include single component displacement coding and multi-component displacement coding. Here, single component displacement coding can be understood as simplified mode displacement coding, that is, only one-dimensional vector is used to represent displacement coefficients. For example, a one-dimensional vector may include any one of a normal vector, a tangent vector, and a bi-tangent vector. The multi-component displacement coding can be understood as displacement coding in a complete mode, that is, three-dimensional vectors, such as normal vector, tangent vector and bitangent vector, are used to represent displacement coefficients.

In some embodiments, the first syntax identification information may act at the sequence level or at the image level, specifically selected according to the actual situation, and the embodiments of the present disclosure are not limited thereto. That is, the first syntax identification information may be a syntax element at the level of the Sequence Parameter Set (SPS) or a level of the syntax element at the frame Parameter Set (FPS). In a case where the first syntax identification information is a syntax element at the level of a sequence parameter set, a single component displacement coding or a multi-component displacement coding indicated by the first syntax identification information is applied for each of images in the entire sequence. In a case where the first syntax identification information is a syntax element at the level of the Frame Parameter Set (FPS), a single component displacement coding or a multi-component displacement coding indicated by the first syntax identification information is applied for each of vertices in the current image.

In some embodiments, the value of the first syntax identification information may include a displacement encoding pattern represented in a variety of forms such as a character or a numerical. As an example, when the value of the first syntax identification information is a first value, it indicates single component displacement coding. When the value of the first syntax identification information is a second value, it indicates multi-component displacement coding. Here, the first value is different from the second value. Exemplarily, the first value may be set to 1 and the second value may be set to 0. Optionally, the first value may be set to 0 and the second value may be set to 1. Optionally, the first value may be set to true and the second value may be set to false. Optionally, the first value may be set to false, and the second value may be set to true. Optionally, the first value and the second value may be set to other different character forms, specifically selected as actual demands, and the embodiments of the present disclosure are not limited thereto.

In S103, in the case where the first syntax identification information represents a single component displacement code, displacement coefficients corresponding to the dimension of the specific vector are determined by fitting the original mesh and the subdivided mesh in the dimension of the specific vector.

In an embodiment of the present disclosure, when the first syntax identification information represents the single component displacement coding, the encoder fits the original mesh and the subdivided mesh on the dimension of the specific vector, determines the approximate points corresponding to the subdivision points in the subdivided mesh on the dimension of the specific vector, and calculates the displacement between the subdivision points and the corresponding approximate points on the dimension of the specific vector as the displacement coefficient corresponding to the dimension of the specific vector.

In some embodiments, the specific vector may include any one of a normal vector, a tangent vector and a bitangent vector.

That is, in an embodiment of the present disclosure, after the subdivided mesh is generated, the original mesh and the subdivided mesh are fitted by deforming a plurality of segments of the subdivided mesh in the dimension of the specific vector, so that the shape of the subdivided mesh is as close as possible to the shape of the original curve, and a better original mesh approximation is obtained. Geometry displacement vectors are calculated for each vertex of the subdivided mesh, and are referred to as displacement coefficients. Specifically, there are one-to-one correspondences between the vertices of the subdivided mesh and the vertices of the deformed mesh, and the one-to-one correspondence are represented by the displacement coefficients of the subdivided mesh.

In some embodiments, the process of S103 may specifically include: for a plurality of subdivision points in the subdivided mesh, determining a plurality of fitting points respectively corresponding to the plurality of subdivision points along the dimension of the specific vector to minimize the volume of the space between the subdivision surface (where the fitting points are located) obtained by the fitting points and the surface of the original mesh. The displacement between each of the plurality of subdivision points and a corresponding fitting point of the plurality of fitting points in the dimension of the specific vector is determined as a displacement coefficient corresponding to the subdivision point.

Figure 13A:
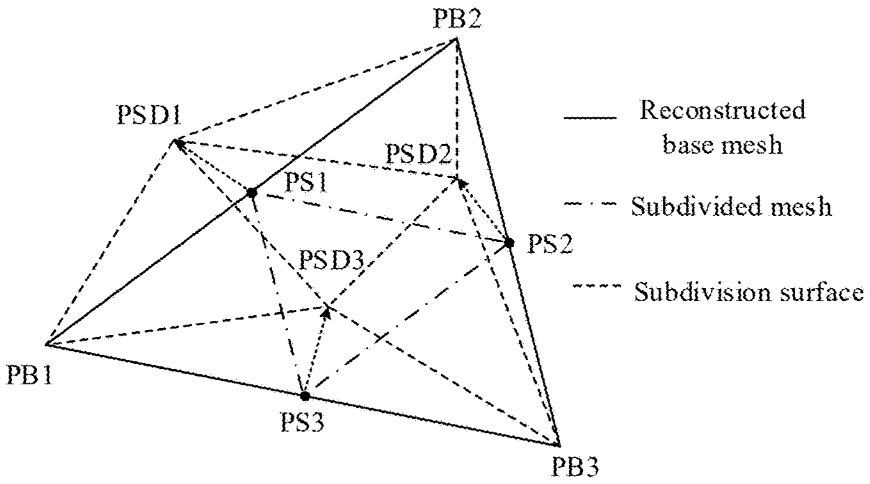
FIG. 13A is a first schematic diagram of a subdivision surface obtained by performing fitting match based on three-dimensional component displacement coefficients.
Figure 13B:
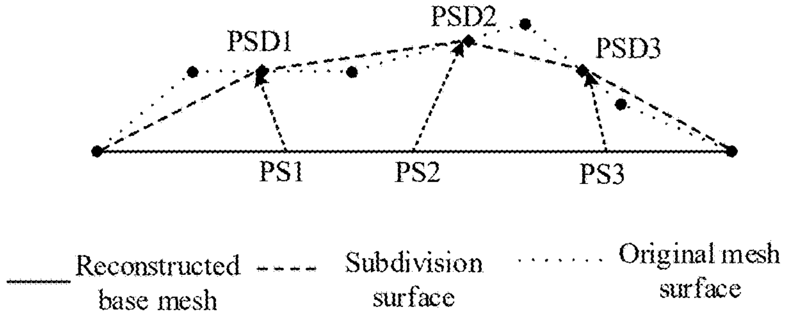
FIG. 13B is a second schematic diagram of a subdivision surface obtained by performing fitting match based on three-dimensional component displacement coefficients.

For example, a triangular face in the reconstructed base mesh can be subdivided by midpoint subdivision as shown by solid lines in FIG. 13A to obtain subdivision points PS1, PS2 and PS3 on each edge. In the case of multi-component displacement coding, in related art, points PSD1, PSD2 and PSD3 in the original mesh closest to PS1, PS2 and PS3 are determined in three-dimensional domain (including a normal vector, tangent vector and bitangent vector). PSD1, PSD2 and PSD3 and vertices PB1, PB2 and PB3 of the triangular face of the reconstructed base mesh form a subdivision surface corresponding to three-dimensional displacement coefficients. In related art, displacement values from subdivision points PS1, PS2 and PS3 to PSD1, PSD2 and PSD3 are calculated, respectively, in the three-dimensional domain to obtain displacement coefficients containing three-dimensional components (including a normal vector component, tangent vector component, and bitangent vector component) (e.g., shown by dashed arrows in FIGS. 13A and 13B). FIG. 13B illustrates the process of calculating displacement coefficients in a three-dimensional domain using a two-dimensional curve as an example.

Figure 14A:
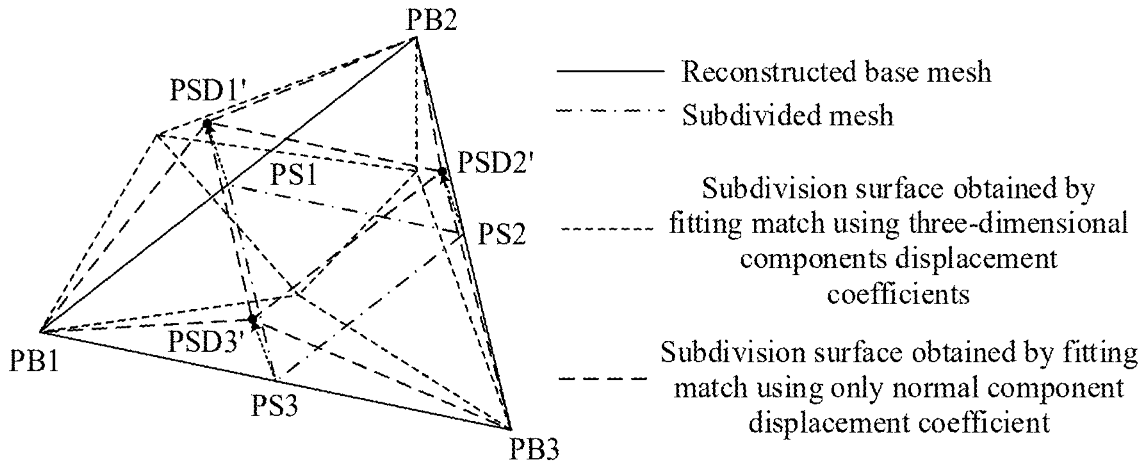
FIG. 14A is a first schematic diagram of a comparison between a subdivision surface obtained by performing fitting match based on three-dimensional component displacement coefficients and a subdivision surface obtained by performing fitting match based on only normal component displacement coefficients in related art.
Figure 14B:
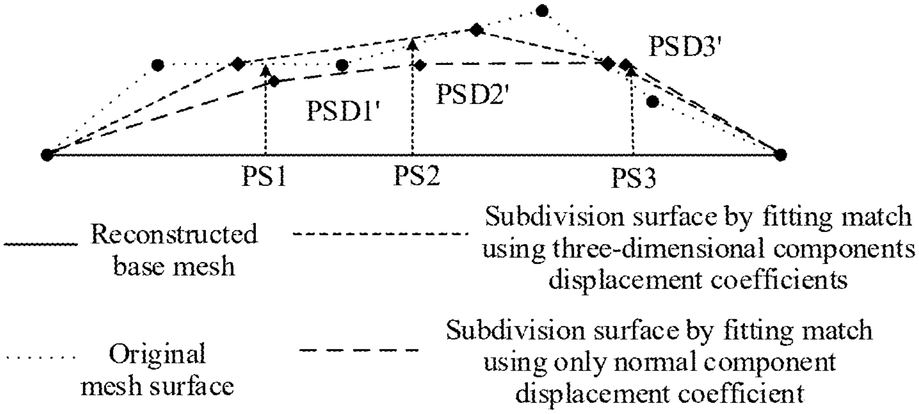
FIG. 14B is a second schematic diagram of a comparison between a subdivision surface obtained by performing fitting match based on three-dimensional component displacement coefficients and a subdivision surface obtained by performing fitting match based on only normal component displacement coefficients in related art.

In the case of single component displacement coding, taking the specific vector as the normal vector as an example, in related art, the displacement coefficients including three-dimensional components are still calculated in the three-dimensional domain, and in the case of single component displacement coding, the tangent vector component and bitangent vector component in the displacement coefficients are discarded, and the normal vector component is retained as the displacement coefficient. As shown in FIGS. 14A and 14B in conjunction with FIGS. 13A and 13B, in related art, in the case of single component displacement coding, fitting points as shown in PSD1', PSD2' and PSD3' are obtained based on subdivision points PS1, PS2 and PS3 in combination with the displacement coefficient in only normal vector component (e.g., shown by dashed arrows in FIGS. 14A and 14B) which is retained from the three-dimensional displacement coefficients. The subdivision surface obtained by fitting according to only the normal component displacement coefficients consists of PSD1', PSD2' and PSD3' and the vertices PB1, PB2 and PB3 of the triangular face of the reconstructed base mesh. It can be seen that in the case of single component displacement coding, the displacement coefficients of single component displacement coding is obtained by discarding the other two displacement components from the displacement coefficients of three-dimensional components and retaining the displacement component of the normal vector, to perform fitting match or reconstruction based on the retained displacement coefficients to obtain the geometry surface of subdivided mesh, which will increase the error between the geometry surface of subdivided mesh and the surface of original mesh. Here, the surface of the original mesh includes the surface of the original mesh defined by the vertices PB1, PB2 and PB3 of the triangular face of the reconstructed base mesh.

Figure 15A:
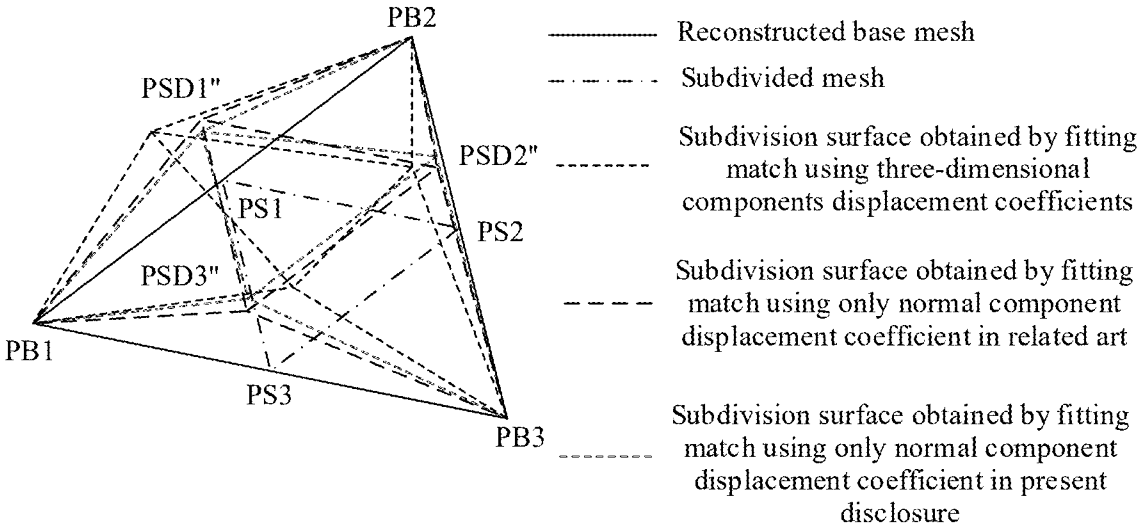
FIG. 15A is a first schematic diagram of a comparison between a subdivision surface obtained by performing fitting match based on only normal component displacement encoding in an encoding method of an embodiment of the present disclosure and that of related art.
Figure 15B:
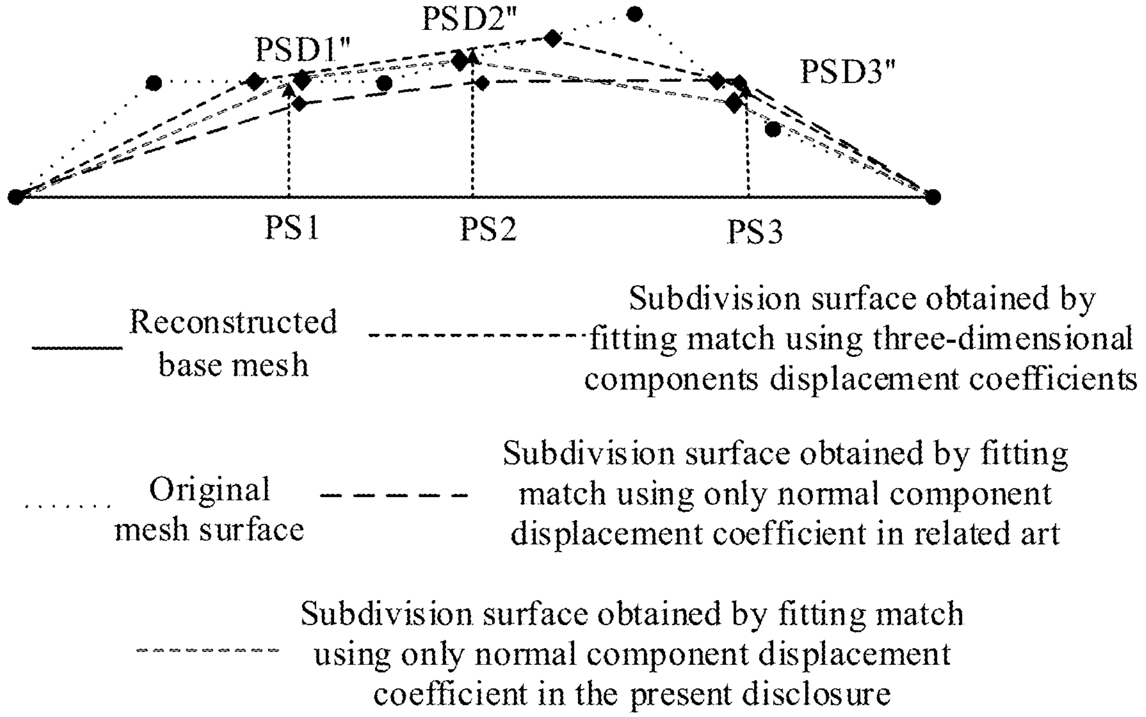
FIG. 15B is a second schematic diagram of a comparison between a subdivision surface obtained by performing fitting match based on only normal component displacement encoding in an encoding method of an embodiment of the present disclosure and that of related art.

In an embodiment of the present disclosure, as shown in FIG. 15A, in order to minimize the volume between the original surface and the subdivision surface, for each of the subdivision points PS1, PS2 and PS3, a search is performed along the dimension of the normal vector to determine fitting points PSD1", PSD2" and PSD3" respectively corresponding to the subdivision points PS1, PS2 and PS3, to minimize the volume of the space between the subdivision surface, which is formed by PSD1", PSD2" and PSD3" and the vertices PB1, PB2 and PB3 of the triangular face of the reconstructed base mesh, and the surface of the original mesh, thereby minimizing the error on only the normal vector component. In the case of normal vector displacement coding, displacement coefficients as shown by the dotted line in FIG. 15B are obtained based on the subdivision points PS1, PS2, and PS3 and the fitting points PSD1", PSD2", and PSD3". It can be seen that, compared with the subdivision surface in the case of normal vector displacement coding in related art, the subdivision surface fitted by the displacement coefficient in the case of normal vector displacement coding calculated according to the embodiments of the present disclosure is closer to the surface of the original mesh and has smaller error.

Figure 16:
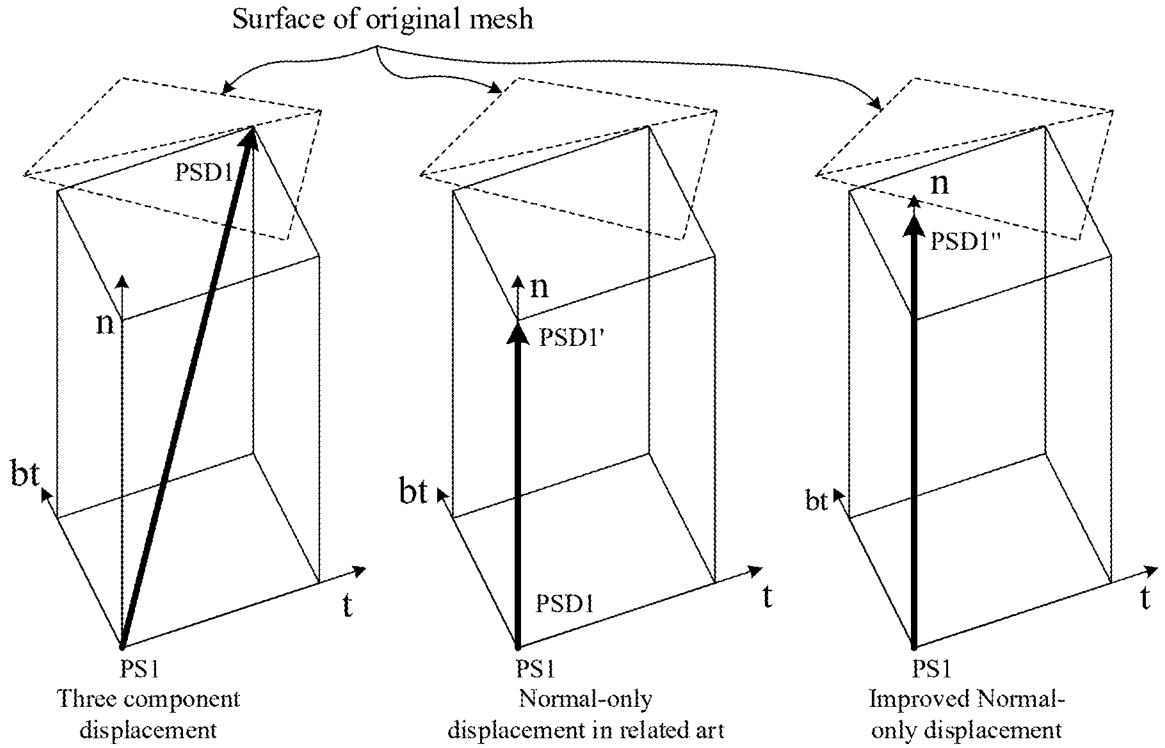
FIG. 16 is a schematic diagram of a comparison between only normal vector displacement coefficient calculated by an encoding method of an embodiment of the present disclosure and that of related art.

In some embodiments, taking a subdivision point PS1 as an example, the three-component displacement coefficients calculated in the three-dimensional domain, the displacement coefficient of the normal vector only calculated in related art, and the displacement coefficient of the normal vector only calculated in embodiments of the present disclosure may be as shown in FIG. 16. It can be seen that since in related art the three-component displacement coefficients are calculated by searching the vertices in the original mesh closest to the subdivision points in the three-dimensional domain, the fitting points PSD1 corresponding to the three-component displacement coefficients intersect with the surface of the original mesh, and in related art the displacement coefficient for only the normal component is obtained by retaining only a component for the normal vector, and its fitting point is shown as PSD1'. As can be seen, the displacement coefficient is quite different from the surface of the original mesh compared with the case of the three-component displacement coefficients. In the embodiments of the present disclosure, the fitting point PSD1" is obtained by searching with the goal of minimizing the volume of the space between the subdivision surface and the surface of the original mesh in only the dimension of the normal vector, and the displacement coefficient corresponding to the fitting point is closer to the surface of the original mesh. This means that the displacement coefficient calculated according to the embodiments of the present disclosure is more accurate for the case of single component displacement coding.

In some embodiments, the subdivision points in the subdivided mesh include a plurality of subdivision points obtained in a subdivision for each of a plurality of triangular faces in the reconstructed base mesh, determining the plurality of fitting points respectively corresponding to the plurality of subdivision points along the dimension of the specific vector to minimize the volume of the space between the subdivision surface obtained by the plurality of fitting points and the surface of the original mesh includes: for the plurality of subdivision points corresponding to the triangular face, determining a plurality of fitting points respectively corresponding to the plurality of subdivision points by searching along the dimension of the specific vector, to minimize a volume of a space of a subdivision surface, which corresponds to three vertices of the triangular face and the plurality of fitting points respectively corresponding to the plurality of subdivision points, and a surface of the original mesh, which corresponds to the three vertices of the triangular face.

In the present embodiment, the subdivision of the reconstructed base mesh may be multiple iterative subdivisions, and a plurality of subdivision points may be obtained in each subdivision. For a triangular face in the reconstructed base mesh, multiple subdivision points are generated in one subdivision. For each of the plurality of subdivision points, a candidate fitting point at each candidate position is searched along the dimension of the specific vector for subdivision point, the search is carried out synchronously based on the plurality of subdivision points, and the volume of the space between the subdivision surface, which corresponds to the plurality of candidate fitting points corresponding to the plurality of subdivision points and the vertices of each triangular face, and the surface of the original mesh, which corresponds to the vertices of the triangular face is estimated. When the volume is minimum, the candidate fitting point corresponding to each currently searched subdivision point is determined as the fitting point corresponding to the subdivision point.

In S104, the displacement coefficients are encoded to obtain encoded bits, the encoded bits are written into the bitstream.

In an embodiment of the present disclosure, the encoder encodes the displacement coefficients calculated on a dimension of a specific vector, and writes the obtained encoded bits into the bitstream.

In some embodiments, the encoder may apply a lift transform to the displacement coefficients to determine the frequency domain displacement coefficients; frequency domain displacement coefficients are mapped to a two-dimensional image using space filling curve to determine projected displacement coefficients; the projected displacement coefficients are encoded, and the obtained encoded bits are written into the bitstream.

Figure 17A:
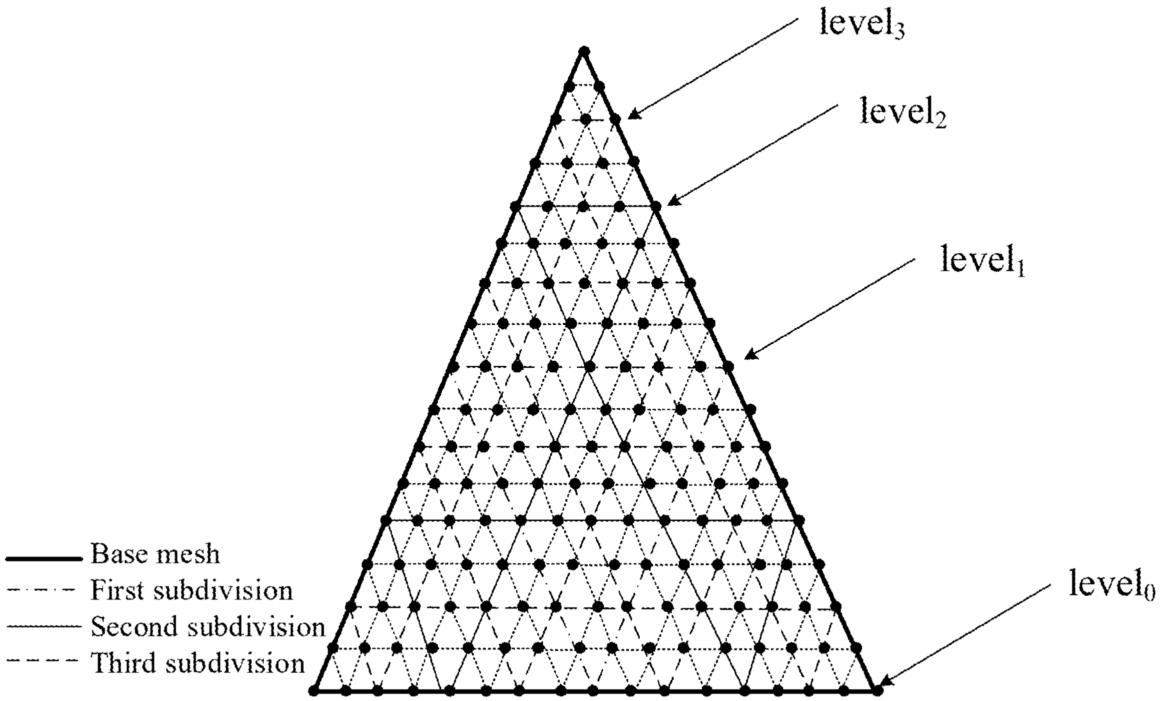
FIG. 17A is a schematic diagram of a base mesh iterative subdivision.
Figure 17B:
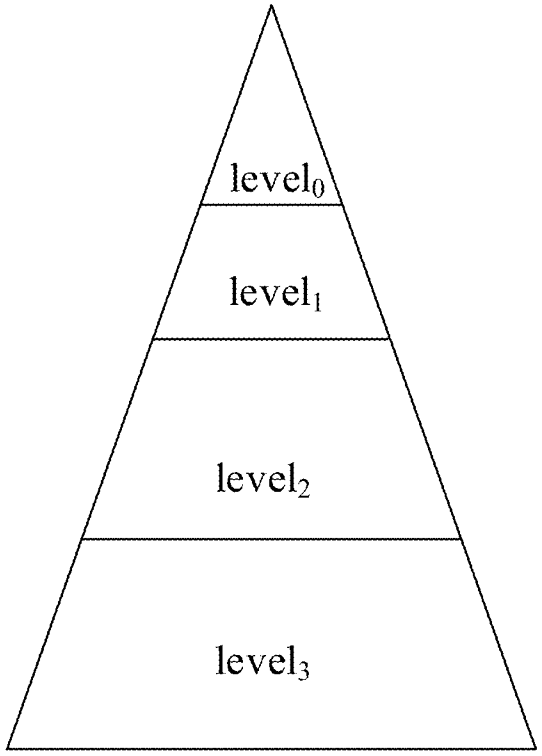
FIG. 17B is a schematic diagram of a level of detail (LOD spatial) structure.

In a specific implementation, at the encoding end, firstly, iterative subdivision is performed using a certain algorithm according to the base mesh to obtain a corresponding mesh position information. The specific subdivision algorithm is for example consistent with the aforementioned content. Linear interpolation is performed based on the vertices on each edge to obtain a corresponding geometry information. Assuming that the whole division is iterated N times (N is equal to or greater than 2), LOD subdivision is performed according to the displacement coefficients obtained by different iterative subdivisions, as shown in FIG. 17A. The base mesh is subdivided by three iterations, and the base mesh is regarded as the 0th iteration corresponding to the 0th layer (level 0). The first iteration adds vertices to form the first layer (level 1), the second iteration adds vertices to form the second layer (level 2), and the third iteration adds vertices to form the third layer (level 3). The specific LOD subdivision structure is shown in FIG. 17B. With the iteration, the number of newly added vertices increases in turn in the respective iterations, forming a pyramid structure: Level 0, Level 1, Level 2 and Level 3.

Secondly, lifting transform is carried out based on LOD spatial structure.

Finally, the transformed coefficients can be quantized, and the quantized coefficients may be packed to obtain a corresponding two-dimensional image. After completing a series of operations, Video-Codec may be used to encode the two-dimensional image.

In an embodiment, the displacement coefficients may be directly encoded using an entropy encoder to obtain a displacement coefficient bitstream. The selection is specifically made as actual demands, and the embodiments of the present disclosure are not limited thereto.

Further, an embodiment of the present disclosure also provides a bitstream generated by bit encoding according to information to be encoded. Here, the information to be encoded includes: displacement coefficients in a dimension of a specific vector that are determined by fitting an original mesh and subdivided mesh of a current image in the dimension of the specific vector, when the value of the first syntax identification information represents single component displacement coding.

Figure 18:
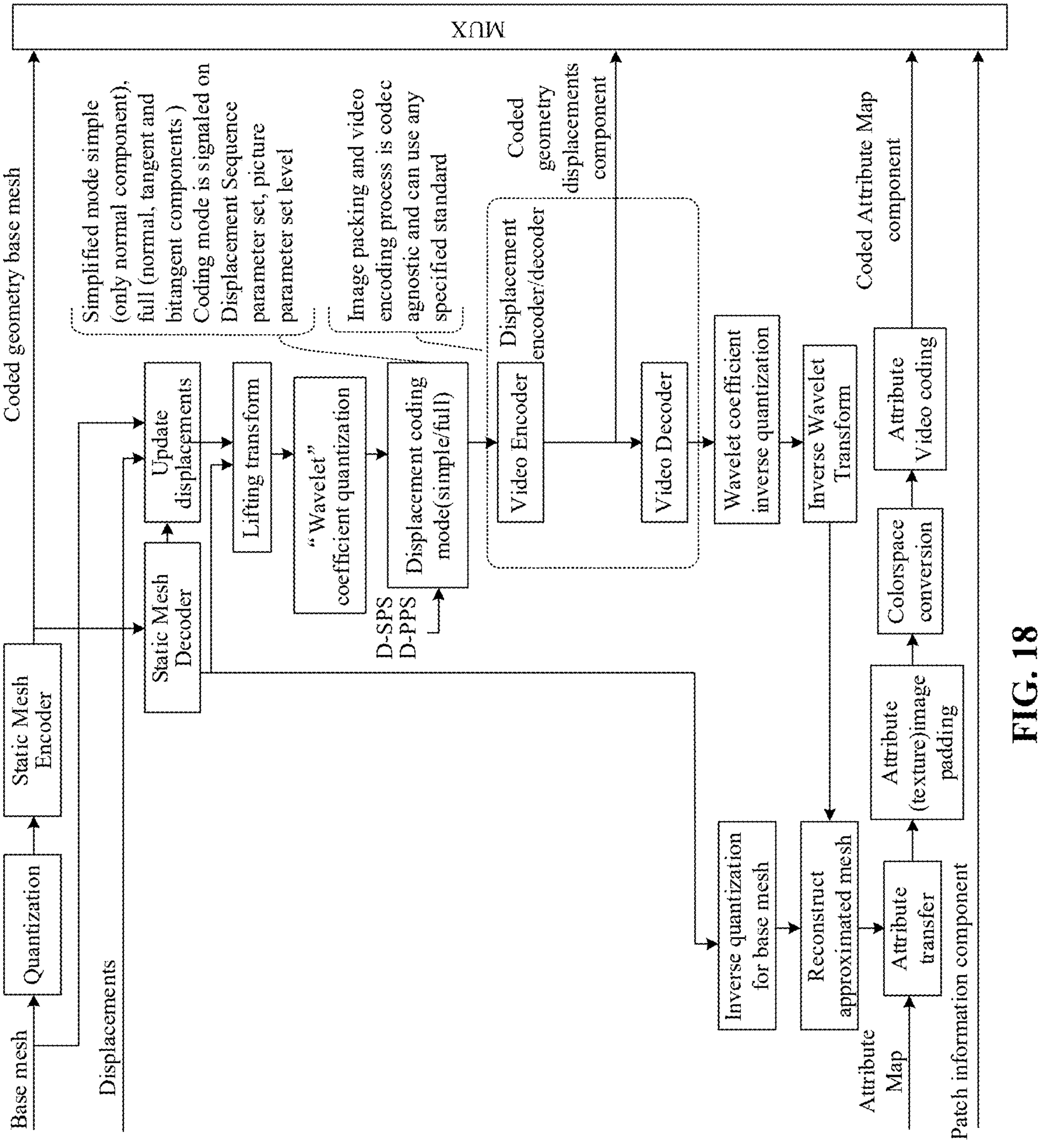
FIG. 18 is a schematic diagram of a framework of an encoder provided by an embodiment of the present disclosure.

In some embodiments, based on the encoding method of the foregoing embodiments, a schematic diagram of an architecture of an encoder provided by an embodiment of the present disclosure may be as shown in FIG. 18. In the encoder, a common Static Mesh Encoder may be used to encode a base mesh, generate a compressed base mesh bitstream corresponding to the base mesh and a reconstructed base mesh. Next, displacement coefficients are updated based on the reconstructed base mesh. Wavelet transform and quantization are performed on the updated displacement coefficients to obtain displacement coefficients. The displacement coefficients are packaged into an image and video which will be encoded by HEVC to generate a compressed displacement bitstream. For attribute map coding, firstly, the feature map is subjected to texture transform according to the difference between the reconstructed geometry information and the original geometry information, and is padded and packed to a video, and then encoded by a video encoder to form a compressed attribute bitstream.

It can be understood that an embodiment of the present disclosure provides an encoding method, In the encoding method, a reconstructed base mesh of a current image is determined according to an original mesh of the current image, a subdivided mesh corresponding to the reconstructed base mesh is determined and a value of first grammar identification information is determined. When the value of the first syntax identification information represents single component displacement coding, the displacement coefficients, that correspond to the original mesh and subdivided mesh, in a dimension of a specific vector are determined by fitting the original mesh and the subdivided mesh in the dimension of the specific vector. The displacement coefficients are encoded, to obtain encoded bits, and the encoded bits are written into a bitstream. In this way, for single component displacement coding, the displacement coefficients can be calculated only on a dimension of a specific vector, which can reduce the influence of other components on the displacement coefficient in the case of single component displacement coding, and can improve the accuracy of the displacement coefficients, thereby improving the accuracy of mesh reconstruction and the quality of geometry information based on the displacement coefficients, and further improving the encoding performance.

Figure 19:
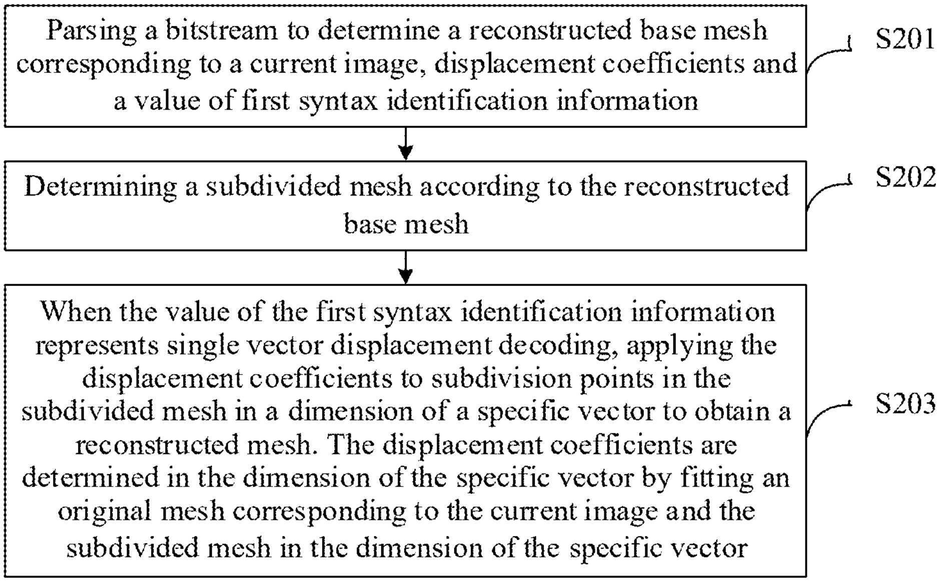
FIG. 19 is a flowchart of a decoding method provided by an embodiment of the present disclosure.

In an embodiment of the present disclosure, referring to FIG. 19, a flowchart of a decoding method provided by the embodiment of the present disclosure is shown. As shown in FIG. 19, the method may include the following operations S201 to S203.

In S201, the bitstream is parsed to determine a reconstructed base mesh, displacement coefficients, and first syntax identification information.

In an embodiment of the present disclosure, the bitstream may include encoded information of a base mesh bitstream, a displacement coefficient bitstream, and first syntax identification information. The decoder (e.g., DRACO) demultiplexes the bitstream and parses the base mesh bitstream to obtain the reconstructed base mesh of a current image. The encoded information of the first syntax identification information is parsed to obtain the first syntax identification information.

In an embodiment of the present disclosure, the first syntax identification information may be applied to a sequence level or an image level, and the selection may be specifically made according to an actual situation, and the embodiments of the present disclosure is not limited thereto. That is, the first syntax identification information may be a syntax element at the level of a Sequence Parameter Set (SPS) or a syntax element at the level of a frame Parameter Set (FPS). In a case where the first syntax identification information is a syntax element at the level of SPS, the single component displacement coding or multi-component displacement coding indicated by the first syntax identification information is applied for each image in an entire sequence. In a case where the first syntax identification information is a syntax element at the level of FPS, the single component displacement coding or multi-component displacement coding indicated by the first syntax identification information is applied for each vertex in the current image.

In some embodiments, the value of the first syntax identification information may include a displacement encoding pattern represented in a variety of forms such as a character or a numerical. As an example, when the value of the first syntax identification information is a first value, it indicates single component displacement coding. When the value of the first syntax identification information is a second value, it indicates multi-component displacement coding. Here, the first value is different from the second value. Exemplarily, the first value may be set to 1 and the second value may be set to 0. Optionally, the first value may be set to 0 and the second value may be set to 1. Optionally, the first value may be set to true and the second value may be set to false. Optionally, the first value may be set to false, and the second value may be set to true. Optionally, the first value and the second value may be set to other different character forms, specifically selected as actual demands, and the embodiments of the present disclosure are not limited thereto.

In some embodiments, the decoder parses the displacement coefficient stream to obtain projected displacement coefficients. The projected displacement coefficients are mapped into a three-dimensional space to determine the frequency domain displacement coefficients. Lifting inverse transform is applied to frequency domain displacement coefficients to determine displacement coefficients.

In an embodiment, at the decoding side, firstly, VideoCodec is adopted to parse the displacement coefficient bitstream to obtain a two-dimensional image, and decode and reconstruct the two-dimensional image to obtain projected displacement coefficients, wherein the two-dimensional image contains the projected displacement coefficients. Secondly, the lifting transform coefficients corresponding to each point can be recovered by packing. Finally, the displacement coefficient of each point can be recovered by using the inverse transform of lifting wavelet transform.

It should be noted that there are many specific decoding methods for displacement system digital stream, such as video decoding, entropy decoding. That is, in an embodiment of the present disclosure, the displacement information may be decoded by a video decoder, or the displacement information may be decoded by an entropy decoder, and no limitation is made herein.

In S202, a subdivided mesh is determined based on the reconstructed base mesh.

In an embodiment of the present disclosure, the procedure of the subdivision of the reconstructed base mesh by the decoder is consistent with that of the encoder, and will not be described here.

In some embodiments, the decoder may obtain mesh subdivision parameters of the current image by parsing the bitstream. The decoder iteratively subdivides the reconstructed base mesh according to the mesh subdivision parameters to determine the subdivided mesh of the current image.

In some embodiments, the mesh subdivision parameters may include a subdivision mode an/or a number of subdivision iterations (also referred to as a subdivision iteration count).

In some embodiments, the decoder parses the bitstream to determine the value of the second syntax identification information, and determine the subdivision mode according to the value of the second syntax identification information.

In some embodiments, the decoder parses the bitstream to determine the value of the third syntax identification information, and determine the number of subdivision iterations according to the value of the third syntax identification information.

In this way, the decoder subdivides the reconstructed base mesh according to the subdivision mode and the number of subdivision iterations to obtain the subdivided mesh. In this way, after subdivision operation, there are one-to-one correspondences between the vertices of the subdivided mesh and the vertices in the reconstructed mesh, and the one-to-one correspondences are represented by the decoded displacement coefficients.

It should be noted that in an embodiment of the present disclosure, the second syntax identification information and the third syntax identification information are frame-level syntax elements. Exemplarily, the second syntax identification information may indicate a subdivision mode of the current frame, and the third syntax identification information may indicate the number of subdivision iterations of the current frame. Thus, the second syntax identification information can be represented as afve_subdivision_method, and the third syntax identification information can be represented as afve_subdivision_iteration_count.

It should also be noted that in an embodiment of the present disclosure, the second syntax identification information and the third syntax identification information may or may not exist in the bitstream, which may be determined by a value of a fourth syntax identification information. In some embodiments, the method may include decoding the bitstream, determining a value of the fourth syntax identification information. When the fourth syntax identification information indicates that the second syntax identification information and the third syntax identification information exist in the frame parameter set extension of the current image, the bitstream is decoded to determine the value of the second syntax identification information, and the bitstream is decoded to determine the value of the third syntax identification information.

In an embodiment of the present disclosure, the fourth syntax identification information may be a frame-level syntax element. Exemplarily, the fourth syntax identification information may indicate whether the second syntax identification information and the third syntax identification information exist in the frame parameter set extension of the current image, and thus the fourth syntax identification information may be represented by afve_subdivision_enable_flag.

In an embodiment of the present disclosure, if the value of the fourth syntax identification information is a first value, it is determined that the fourth syntax identification information indicates that the second syntax identification information and the third syntax identification information exist in the frame parameter set extension of the current image. If the value of the fourth syntax identification information is a second value, it is determined that the fourth syntax identification information indicates that the second syntax identification information and the third syntax identification information do not exist in the frame parameter set extension of the current image.

In an embodiment of the present disclosure, the first value is different from the second value. Exemplarily, the first value may be set to 1 and the second value may be set to 0. Optionally, the first value may be set to 0 and the second value may be set to 1. Optionally, the first value may be set to true and the second value may be set to false. Optionally, the first value may be set to false, and the second value may be set to true.

In a specific embodiment, the first value may be 1 and the second value may be 0. That is to say, if the value of afve_overriden_flag is 1, there are afve_subdivision_enable_flag, afve_geometry_coordinates_enable_flag and other parameters in the frame parameter set extension of the current image. If the value of afve_subdivision_enable_flag is 1, then afve_subdivision_method and afve_subdivision_iteration_count exist in the frame parameter set extension of the current image. If there is no afve_subdivision_ enable_flag in the bitstream, then it can be inferred that its value is equal to 0, and then there are no afve_subdivision_method and afve_subdivision_iteration_count in the frame parameter set extension of the current image.

In S203, in the case where the value of first syntax identification information represents single component displacement coding, displacement coefficients are applied to subdivision points in the subdivided mesh in the dimension of the specific vector to obtain a reconstructed mesh. The displacement coefficient is determined in the dimension of the specific vector by fitting the original mesh of the current image and the subdivided mesh in the dimension of the specific vector.

In an embodiment of the present disclosure, after the subdivision points in the subdivided mesh are obtained and the displacement coefficients corresponding to the subdivision points are decoded, the geometry corresponding to the reconstructed mesh is according to the geometry of the reconstructed base mesh and the displacement coefficients.

In an embodiment of the present disclosure, in the case where the first syntax identification information represents a single component displacement coding, the displacement coefficients are determined in a dimension of a specific vector by fitting the original mesh corresponding to the base mesh and the subdivided mesh in the dimension of the specific vector. The calculation process of the displacement coefficients have been described in the encoder embodiment and will not be repeated here. Therefore, the decoder applies the displacement coefficients to the subdivision points in the subdivided mesh along the dimension of the specific vector to obtain the reconstructed subdivision points corresponding to the subdivision points, and obtains the reconstructed mesh based on the reconstructed subdivision points corresponding to respective subdivision points.

It should be noted that the specific vector includes any one of a normal vector, a tangent vector and a bitangent vector.

In some embodiments, in the case that the specific vector includes a normal vector, for an edge in the reconstructed base mesh, a normal corresponding to the edge is determined from a plane containing two endpoints of the edge. The displacement coefficient is applied to the subdivision point on the edge along the normal to obtain the reconstructed subdivision point. A reconstructed mesh is obtained based on the reconstructed subdivision points. In other words, a displacement is calculated along a normal, where the subdivision point is located, according to the position of the subdivision point and the displacement coefficient, and then a reconstructed subdivision point corresponding to the subdivision point is obtained. A reconstructed mesh is obtained based on the reconstructed subdivision points corresponding to the respective subdivision points.

An embodiment of the present disclosure provides a decoding method. In the decoding method, a reconstructed base mesh of a current image, displacement coefficients and a value of first syntax identification information are determined by parsing a bitstream. A subdivided mesh is determined by subdividing the reconstructed base mesh. When the value of first syntax identification information represents single component displacement coding, displacement coefficients are applied to subdivision points in the subdivided mesh in a dimension of a specific vector to obtain a reconstructed mesh. In other words, the displacement coefficients are determined in the dimension of the specific vector by fitting the original mesh and subdivided mesh of the current image on the dimension of a specific vector. Thus, for single component displacement coding, only the displacement coefficients calculated in a dimension of a specific vector are applied to the subdivision points in the subdivided mesh to obtain the reconstructed mesh, the matching degree between the reconstructed mesh and the original mesh can be improved, and the accuracy of reconstruction and quality of mesh geometry can be improved. Therefore, the decoding performance can be improved.

Figure 20:
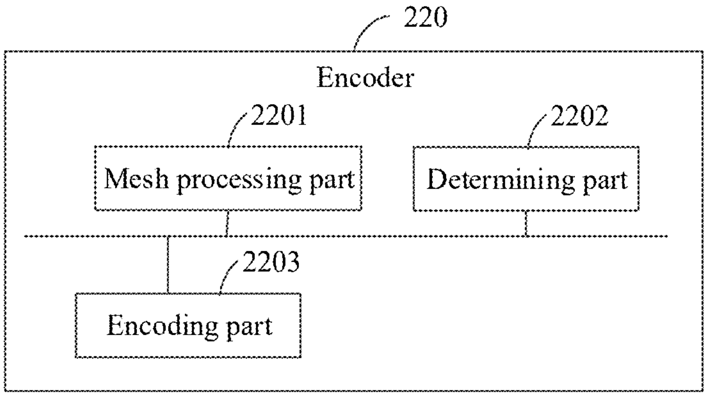
FIG. 20 is a schematic diagram of a structure of an encoder provided by an embodiment of the present disclosure.

In yet another embodiment of the present disclosure, based on the same inventive concept as the previous embodiments, FIG. 20 shows a schematic diagram of the structure of an encoder provided by an embodiment of the present disclosure. As shown in FIG. 20, the encoder 220 may include a mesh processing part 2201, a determining part 2202 and an encoding part 2203.

The mesh processing part 2201 is configured to determine a reconstructed base mesh of a current image according an original mesh of the current image, and determine a subdivided mesh corresponding to the reconstructed base mesh.

The determining part 2202 is configured to determine a value of first syntax identification information; and in the case where the value of the first syntax identification information represents a single component displacement coding, determine displacement coefficients corresponding to a dimension of a specific vector fitting an original mesh and the subdivided mesh in the dimension of the specific vector.

The encoding part 2203 is configured to encode the displacement coefficients to obtain encoded bits write the encoded bits into a bitstream.

In some embodiments, the determining part 2202 is further configured to: for a plurality of subdivision points in the subdivided mesh, determine a plurality of fitting points respectively corresponding to the plurality of subdivision points along the dimension of the specific vector to minimize a volume of a space between a subdivision surface obtained by the plurality of fitting points and a surface of the original mesh; and determine a displacement between each of the plurality of subdivision points and a corresponding fitting point of the plurality of fitting points in the dimension of the specific vector as a displacement coefficient corresponding to the subdivision point.

In some embodiments, the subdivision points include a plurality of subdivision points obtained in each subdivision for each triangular face in the reconstructed base mesh. The determining part 2202 is further configured to: for the plurality of subdivision points corresponding to the triangular face, determine a plurality of fitting points respectively corresponding to the plurality of subdivision points by searching along the dimension of the specific vector, to minimize a volume of a space of a subdivision surface, which corresponds to three vertices of the triangular face and the plurality of fitting points respectively corresponding to the plurality of subdivision points, and a surface of the original mesh, which corresponds to the three vertices of the triangular face.

In some embodiments, the specific vector includes any one of a normal vector, a tangent vector, and a bitangent vector.

In some embodiments, the encoding part 2203 is further configured to: apply lifting transform to the displacement coefficients to determine frequency domain displacement coefficients; map the frequency domain displacement coefficients into a two-dimensional image by using a space filling curve to determine projected displacement coefficient; and encode the projected displacement coefficients to obtain encoded bits and write the encoded bits into the bitstream.

In some embodiments, the mesh processing part 2201 is further configured to perform down-sampling processing on an original mesh of the current image to determine a base mesh of the current image; encode and reconstructed the base mesh to determined a reconstructed base mesh.

In some embodiments, the encoding part 2203 is further configured to write encoded bits, that are obtained by encoding the base mesh, into the bitstream.

In some embodiments, the encoding part 2203 is further configured to encode the value of the first syntax identification information to obtain encoded bits, and write the encoded bits into the bitstream.

In some embodiments, the mesh processing part 2201 is further configured to: determine mesh subdivision parameters of the current image; and determine a subdivided mesh by iteratively subdividing the reconstructed base mesh according to the mesh subdivision parameters.

In some embodiments, the mesh subdivision parameter comprises a subdivision mode and/or the number of subdivision iterations.

In some embodiments, the encoding part 2203 is further configured to: determine a value of second syntax identification information according to the subdivision mode; and encode the value of the second syntax identification information to obtain encoded bits, and write the encoded bits into the bitstream.

In some embodiments, the encoding part 2203 is further configured to: determining a value of third grammar identification information according to the number of subdivision iterations; encode the value of the third syntax identification information to obtain encoded bits, and write the encoded bits into the bitstream.

It will be understood that in embodiments of the present disclosure, a "part" may be a part of a circuit, a part of a processor, a part of a program or software, etc. It may of course also be a module, or may be non-modular. Moreover, various components in the embodiments of the present disclosure may be integrated in a single processing unit, various units may exist physically alone, or two or more units may be integrated in a single unit. The integrated unit can be realized either in the form of hardware or in the form of software function module.

The integrated unit, if implemented in the form of a software functional module and not sold or used as a stand-alone product, may be stored in a computer-readable storage medium. Based on this understanding, the technical proposal of the embodiment of the present disclosure may be embodied in the form of a software product, which may be stored in a storage medium, including instructions for causing a computer device (which may be a personal computer, server, mesh device, etc.) or processor (processor) to perform all or part of the steps of the method of the embodiments of the present disclosure. The aforementioned storage media includes a U disk, a removable hard disk, a Read Only Memory (ROM), a Random Access Memory (RAM), a magnetic disk or an optical disk and other media capable of storing program codes.

Thus, an embodiment of the present disclosure provides a computer-readable storage medium applied to the encoder 220. The computer-readable storage medium stores a computer program that, when executed by a first processor, implements the method of any of the preceding embodiments.

Figure 21:
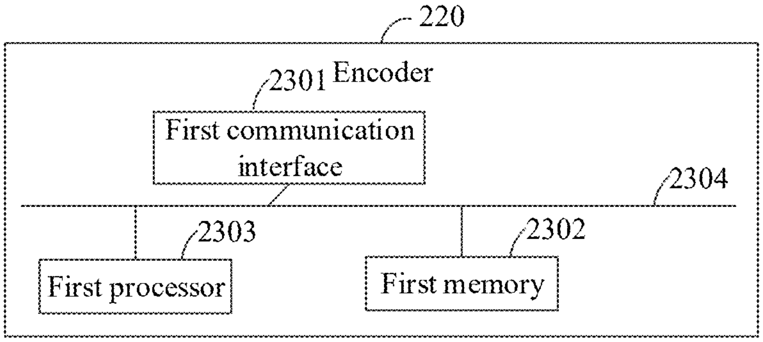
FIG. 21 is a schematic diagram of a specific hardware structure of an encoder provided by an embodiment of the present disclosure.

Based on the composition of the encoder 220 and the computer-readable storage medium, FIG. 21 shows a schematic diagram of a specific hardware structure of the encoder 220 provided by an embodiment of the present disclosure. As shown in FIG. 21, the encoder 220 may include a first communication interface 2301, a first memory 2302, and a first processor 2303. The components are coupled together by a first bus system 2304. It can be understood that the first bus system 2304 is used to implement connection and communication among these components. The first bus system 2304 includes a data bus, a power bus, a control bus and a status signal bus. For clarity of illustration, the various buses are designated as a first bus system 2304 in FIG. 21.

The first communication interface 2301 is used for receiving and transmitting signals in the process of sending and receiving information with other external network elements.

The first memory 2302 is used to store a computer program executable for the first processor 2303.

The first processor 2303 is configured to, when running the computer program, perform: determining a reconstructed base mesh of a current image according an original mesh of the current image; determining a subdivided mesh corresponding to the reconstructed base mesh and determining a value of first grammar identification information; determining displacement coefficients corresponding to a dimension of a specific vector by fitting an original mesh and the subdivided mesh in the dimension of the specific vector when the value of the first grammar identification information represents a single component displacement code; encoding the displacement coefficients to obtain encoded bits, and write the encoded bits into the bitstream.

It will be appreciated that the first memory 2302 in embodiments of the present disclosure may be a volatile memory or a non-volatile memory, or may include both volatile memory and non-volatile memory. The non-volatile memory may be Read-Only Memory (ROM), Programmable ROM (PROM), Erasable PROM (EPROM), Electrically Erasable EPROM (EEPROM), or flash memory. The volatile memory may be a Random Access Memory (RAM) which serves as an external cache. By way of illustration, but not limitation, many forms of RAM are available, such as static random access memory (SRAM), dynamic random access memory (DRAM), synchronous dynamic random access memory (SDRAM), double data rate synchronous dynamic random access memory (DDRSDRAM), enhanced synchronous dynamic random access memory (Enhanced SDRAM, ESDRAM), synchronous link dynamic random access memory (Synchlink DRAM, SLDRAM), and direct Rambus RAM. The first memory 2302 of the systems and methods described in the present disclosure is intended to include, but not limited to, these and any other suitable types of memory.

The first processor 2303 may be an integrated circuit chip with signal processing capability. In implementation, the steps of the above method may be accomplished by integrated logic circuitry of hardware in the first processor 2303 or by instructions in the form of software. The first processor 2303 described above may be a general purpose processor, a Digital Signal Processor (DSP), an Application Specific Integrated Circuit (ASIC), a Field Programmable Gate Array (FPGA), or other programmable logic device, a discrete gate or transistor logic device, or a discrete hardware component. The disclosed methods, steps, and logic block diagrams in the disclosed embodiments may be implemented or performed. The general purpose processor may be a microprocessor or the processor may be any conventional processor or the like. The steps of the method disclosed in combination with the embodiment of the present disclosure can be directly embodied as the completion of the execution of the hardware decoding processor or the completion of the combined execution of the hardware and software modules in the decoding processor. The software module may be located in RAM, flash memory, read-only memory, programmable read-only memory or electrically erasable programmable memory, registers and other storage media mature in the art. The storage medium is located in the first memory 2302, and the first processor 2303 reads the information in the first memory 2302 and completes the steps of the above method in combination with its hardware.

It will be appreciated that the embodiments described in the present disclosure may be implemented in hardware, software, firmware, middleware, microcode or a combination thereof. For a hardware implementation, the processing unit may be implemented in one or more Application Specific Integrated Circuits (ASIC), Digital Signal Processors (DSPD), Digital Signal Processing Devices (DSPD), Programmable Logic Devices (PLD), Field-Programmable Gate Arrays (FPGA), general purpose processors, controllers, microcontrollers, microprocessors, other electronic units for performing the functions described in the present disclosure, or combinations thereof. For a software implementation, the techniques of the present disclosure may be implemented by modules (e.g., procedures, functions, etc.) that perform the functions of the present disclosure. The software codes may be stored in memory and executed by a processor. The memory can be implemented in the processor or outside the processor.

Optionally, in an embodiment, the first processor 2303 is further configured to perform the encoding method described in any of the preceding embodiments when running the computer program.

In an embodiment of the present disclosure, there is provided an encoder. The encoder determine a reconstructed base mesh of a current image according to an original mesh of the current image, determine a subdivided mesh corresponding to the reconstructed base mesh and determine a value of first grammar identification information, when the value of the first syntax identification information represents the single component displacement coding, determine displacement coefficients corresponding to the original mesh and the subdivided mesh in a dimension of a specific vector by fitting the original mesh and the subdivided mesh in the dimension of the specific vector; encode the displacement coefficients to obtain encoded bits and write the encoded bits into a bitstream. In this way, for single component displacement coding, the displacement coefficients can be calculated only on a dimension of a specific vector, which reduces the influence of other components on the displacement coefficients in the case of single component displacement coding, improves the accuracy of the displacement coefficients, and further improves the accuracy of mesh reconstruction based on the displacement coefficients and the quality of reconstruction geometry. Therefore, the coding performance can be improved.

Figure 22:
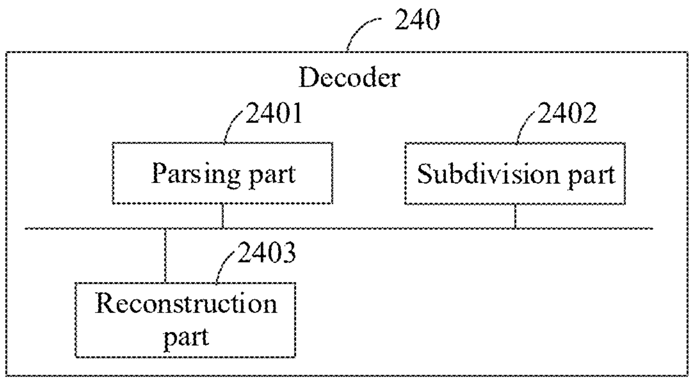
FIG. 22 is a schematic diagram of a structure of a decoder provided by an embodiment of the present disclosure.

Based on the same inventive concept of the foregoing embodiments FIG. 22 shows a schematic diagram of a structure of a decoder provided by an embodiment of the present disclosure. As shown in FIG. 22, the decoder 240 may include parsing part 2401 a subdivision part 2402 and a reconstruction part 2403.

The parsing part 2401 is configured to parse the bitstream to determine a reconstructed base mesh of a current image, displacement coefficients and a value of first syntax identification information.

The subdivision part 2402 is configured to determine a subdivided mesh according to the base mesh.

The reconstruction part 2403 is configured to apply the displacement coefficients to subdivision points in the subdivided mesh in a dimension of a specific vector to obtain a reconstructed mesh when the value of the first syntax identification information represents single component displacement coding.

The displacement coefficients are determined in the dimension of the specific vector by fitting the original mesh of the current image and the subdivided mesh in the dimension of the specific vector.

In some embodiments, the specific vector includes any one of a normal vector, a tangent vector, and a bitangent vector.

In some embodiments, the reconstruction part 2403 is further configured to: when the specific vector is a normal vector, determine a normal corresponding to each of a plurality of edges in the reconstructed base mesh according to a plane containing two endpoints of the edge; apply a displacement coefficient to a subdivision point on the edge along the normal to obtain a reconstructed subdivision point corresponding to the subdivision point; and obtaining the reconstruction mesh based on reconstructed subdivision points.

In some embodiments, the parsing part 2401 is further configured to: parse the bitstream to determine projected displacement coefficients; map the projected displacement coefficients into a three-dimensional space to determine the frequency domain displacement coefficient, and apply lifting inverse transform to the frequency domain displacement coefficients to determine the displacement coefficients.

In some embodiments, the subdivision part 2402 is further configured to: determine mesh subdivision parameters of the current image, and determine the subdivided mesh of the current image by iteratively subdividing the reconstructed base mesh according to the mesh subdivision parameters.

In some embodiments, the mesh subdivision parameters include a subdivision mode and/or the number of subdivision iterations (also referred to as subdivision iteration count).

In some embodiments, the parsing part 2401 is further configured to decode the bitstream to determine a value of second syntax identification information, and determine the subdivision mode according to the value of the second syntax identification information.

In some embodiments, the parsing part 2401 is further configured to decode the bitstream and determine a value of third syntax identification information, and determine the number of subdivision iterations according to the value of the third syntax identification information.

It will be understood that in the embodiments, a "part" may be a part of a circuit, a part of a processor, a part of a program or software, etc. It may of course also be a module, or may be non-modular. Moreover, various components in the embodiments of the present disclosure may be integrated in a single processing unit, various units may exist physically alone, or two or more units may be integrated in a single unit. The integrated unit may be realized either in the form of hardware or in the form of software function module.

The integrated unit may be stored in a computer-readable storage medium, if implemented in the form of a software functional module and not sold or used as a stand-alone product. Based on this understanding, the embodiments of the present disclosure provide a computer-readable storage medium, applied to the decoder 240. The computer-readable storage medium stores a computer program that implements the method of any of the preceding embodiments when executed by a second processor.

Figure 23:
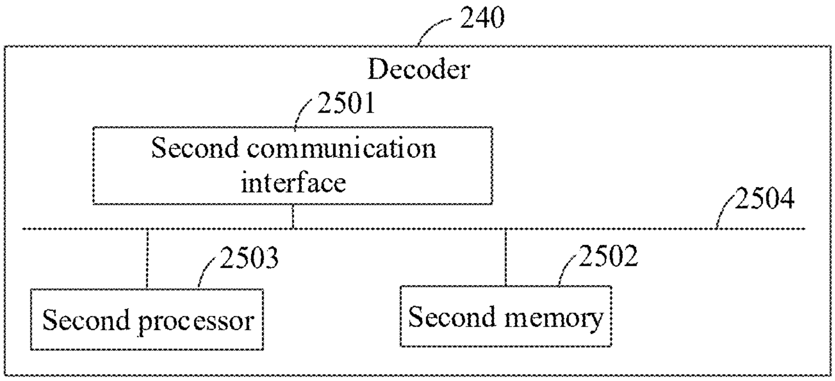
FIG. 23 is a schematic diagram of a specific hardware structure of a decoder provided by an embodiment of the present disclosure.

Based on the composition of the decoder 240 and the computer-readable storage medium, FIG. 23 shows a schematic diagram of a specific hardware structure of the decoder 240 provided by an embodiment of the present disclosure. As shown in FIG. 23, the decoder 240 may include a second communication interface 2501, a second memory 2502, and a second processor 2503. The components are coupled together by a second bus system 2504. It can be understood that the second bus system 2504 is used to implement connection and communication among these components. The second bus system 2504 includes a data bus, a power bus, a control bus and a status signal bus. For clarity of illustration, the various buses are designated as a second bus system 2504 in FIG. 23.

The second communication interface 2501 is used for receiving and transmitting signals in the process of sending and receiving information with other external network elements.

The second memory 2502 is used to store a computer program that can be run on the second processor 2503.

The second processor 2503 is configured to: when running the computer program, parse the bitstream to determine a reconstructed base mesh, displacement coefficients, and a value of first syntax identification information; determine a subdivided mesh according to the reconstructed base mesh; when the value of the first syntax identification information represents single component displacement coding, apply the displacement coefficients to subdivision points in the subdivided mesh in a dimension of a specific vector to obtain a reconstructed mesh.

The displacement coefficients are determined in the dimension of the specific vector by fitting the original mesh of a current image and the subdivided mesh in the dimension of the specific vector.

Optionally, in an embodiment, the second processor 2503 is further configured to perform the decoding method described in any of the preceding embodiments while running the computer program.

It will be understood that the second memory 2502 is similar in hardware function to the first memory 2302, and the second processor 2503 is similar in hardware function to the first processor 2303 and will not be described in detail herein.

In an embodiment of the present disclosure, there is provided a decoder. The decoder determines parses a bitstream to determine a reconstructed base mesh of a current image, displacement coefficients and a value of first grammar identification information, determines the subdivided mesh by subdividing the reconstructed base mesh, and when the value of the first syntax identification information represents single component displacement coding, applies displacement coefficients to subdivision points in the subdivided mesh in a dimension of a specific vector to obtain a reconstructed mesh. Because the displacement coefficients are determined in the dimension of the specific vector by fitting the original mesh of the current image and subdivided mesh in the dimension of the specific vector. Thus, for single component displacement coding, only the displacement coefficients calculated in the dimension of the specific vector are applied to the subdivision points in the subdivided mesh to obtain the reconstructed mesh, which can improve the matching degree between the reconstructed mesh and the original mesh, and improve the accuracy of mesh reconstruction and geometry quality. Therefore, the decoding performance can be improved.

Figure 24:
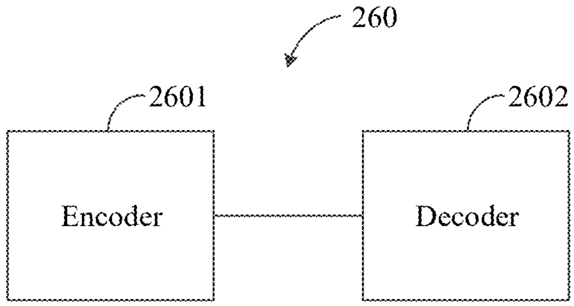
FIG. 24 is a schematic diagram of a structure of a codec system provided by an embodiment of the present disclosure.

In yet another embodiment of the present disclosure, a schematic diagram of a structure of a codec system provided by an embodiment of the present disclosure is shown in FIG. 24. As shown in FIG. 24, the codec system 260 may include an encoder 2601 and a decoder 2602.

In an embodiment of the present disclosure, the encoder 2601 may be an encoder as described in any of the foregoing embodiments, and the decoder 2602 may be a decoder as described in any of the foregoing embodiments.

It should be noted that, in the present disclosure, the terms "including," "comprising," or any other variation thereof are intended to encompass non-exclusive inclusion such that a process, method, article, or apparatus including a set of elements includes not only those elements but also other elements not explicitly listed, or also elements inherent to such a process, method, article, or apparatus. In the absence of further limitations, an element defined by the phrase "includes/comprises a/an . . . " does not preclude the existence of another identical element in the process, method, article or device in which it is included.

The above serial numbers of the embodiments of the present disclosure are for description only and do not represent the advantages and disadvantages of the embodiments.

The methods disclosed in several method embodiments provided in the present disclosure can be arbitrarily combined without conflict to obtain new method embodiments.

Features disclosed in several product embodiments provided in the present disclosure can be arbitrarily combined without conflict to obtain new product embodiments.

Features disclosed in several method or device embodiments provided in the present disclosure can be arbitrarily combined without conflict to obtain new method or device embodiments.

The above-mentioned is only a specific embodiment of the present disclosure, but the scope of protection of the present disclosure is not limited thereto. Any skilled person familiar with the technical field can easily conceive changes or substitutions within the technical scope of the present disclosure, and the changes or substitutions should be covered within the scope of protection of the present disclosure. Therefore, the scope of protection of this disclosure shall be subject to the scope of protection of the claims.

INDUSTRIAL APPLICABILITY

The embodiments of the present disclosure provide a decoding method, encoding method, bitstream, decoder, encoder and storage medium. At the encoder end, a reconstructed base mesh of a current image is determined according to an original mesh of the current image; a subdivided mesh corresponding to the reconstructed base mesh is determined and a value of first grammar identification information is determined; when the value of the first syntax identification information represents single component displacement coding, displacement coefficients are determined corresponding to a dimension of a specific vector by fitting the original mesh and the subdivided mesh in the dimension of the specific vector; and the displacement coefficients are encoded to obtain encoded bits and the encoded bits are written into a bitstream. At the decoding end, a reconstructed base mesh of a current image, displacement coefficients and a value of first syntax identification information are determined by parsing a bitstream, wherein the reconstructed base mesh is reconstructed based on an original mesh of the current image; determining a subdivided mesh according to the reconstructed base mesh; and when the value of the first syntax identification information represents single component displacement coding, the displacement coefficients are applied to subdivision points in the subdivided mesh in a dimension of a specific vector to obtain a reconstructed mesh, wherein the displacement coefficients are determined in the dimension of the specific vector by fitting the original mesh of the current image and the subdivided mesh in the dimension of the specific vector. In this way, for single component displacement coding, the displacement coefficients can be calculated only in a dimension of a specific vector, which reduces influence of other components on the displacement coefficient in the case of single component displacement coding and improves accuracy of the displacement coefficients. For single component displacement coding, only the displacement coefficients calculated in a dimension of a specific vector are applied to subdivision points in a subdivided mesh to obtain a reconstructed mesh, which can improve the matching degree between a reconstructed mesh and an original mesh, and can improve accuracy of the reconstructed mesh and quality of geometry of the reconstructed mesh. Therefore, the codec performance can be improved.

The invention claimed is:

1. A decoding method, performed by a decoder, comprising:

determining a reconstructed base mesh of a current image, displacement coefficients and a value of first syntax identification information by parsing a bitstream, wherein the reconstructed base mesh is reconstructed based on an original mesh of the current image;

determining a subdivided mesh according to the reconstructed base mesh; and when the value of the first syntax identification information represents single component displacement coding, applying the displacement coefficients to subdivision points in the subdivided mesh in a dimension of a specific vector to obtain a reconstructed mesh, wherein the specific vector comprises one of a normal vector, a tangent vector, and a bitangent vector, and the displacement coefficients are determined in the dimension of the specific vector by fitting the original mesh of the current image and the subdivided mesh in the dimension of the specific vector.

2. The decoding method of claim 1, wherein the displacement coefficients are determined by:

for a plurality of subdivision points in the subdivided mesh, determining a plurality of fitting points respectively corresponding to the plurality of subdivision points along the dimension of the specific vector to minimize a volume of a space between a subdivision surface obtained by the plurality of fitting points and a surface of the original mesh; and determining a displacement between each of the plurality of subdivision points and a corresponding fitting point of the plurality of fitting points in the dimension of the specific vector as a displacement coefficient corresponding to the subdivision point.

3. The decoding method of claim 1, wherein applying the displacement coefficients to the subdivision points in the subdivided mesh in the dimension of the specific vector to obtain the reconstructed mesh comprises:

when the specific vector comprises a normal vector, determining a normal corresponding to each of a plurality of edges in the reconstructed base mesh according to a plane containing two endpoints of the edge;

applying a displacement coefficient to a subdivision point on the edge along the normal to obtain a reconstructed subdivision point corresponding to the subdivision point; and obtaining the reconstruction mesh based on reconstructed subdivision points.

4. The decoding method of claim 3, wherein determining the displacement coefficients by parsing the bitstream comprises:

determining projected displacement coefficients by parsing the bitstream;

mapping the projected displacement coefficients into a three-dimensional space to determine frequency domain displacement coefficients; and applying lifting inverse transform to the frequency domain displacement coefficients to determine the displacement coefficients.

5. The decoding method of claim 1, wherein determining the subdivided mesh according to the reconstructed base mesh comprises:

determining mesh subdivision parameters of the current image; and determining the subdivided mesh of the current image by performing iterative subdivision on the reconstructed base mesh according to the mesh subdivision parameters.

6. The decoding method of claim 5, wherein the subdivided mesh parameters comprise a subdivision mode and/or a number of subdivisions.

7. The decoding method of claim 6, further comprising:

determining a value of second syntax identification information by parsing the bitstream; and determining the subdivision mode according to the value of the second syntax identification information.

8. The decoding method of claim 6, further comprising:

determining a value of third syntax identification information by parsing the bitstream; and determining the number of subdivisions according to the value of the third syntax identification information.

9. An encoding method, performed by an encoder, comprising:

determining a reconstructed base mesh of a current image according to an original mesh of the current image;

determining a subdivided mesh corresponding to the reconstructed base mesh and determining a value of first syntax identification information;

when the value of the first syntax identification information represents single component displacement coding, determining displacement coefficients corresponding to a dimension of a specific vector by fitting the original mesh and the subdivided mesh in the dimension of the specific vector, wherein the specific vector comprises one of a normal vector, a tangent vector, and a bitangent vector; and encoding the displacement coefficients to obtain encoded bits and writing the encoded bits into a bitstream.

10. The encoding method of claim 9, wherein determining the displacement coefficients corresponding to the dimension of the specific vector by fitting the original mesh and the subdivided mesh in the dimension of the specific vector comprises:

for a plurality of subdivision points in the subdivided mesh, determining a plurality of fitting points respectively corresponding to the plurality of subdivision points along the dimension of the specific vector to minimize a volume of a space between a subdivision surface obtained by the plurality of fitting points and a surface of the original mesh; and determining a displacement between each of the plurality of subdivision points and a corresponding fitting point of the plurality of fitting points in the dimension of the specific vector as a displacement coefficient corresponding to the subdivision point.

11. The encoding method of claim 10, wherein the subdivision points comprise a plurality of subdivision points obtained in a subdivision for each of a plurality of triangular faces in the reconstructed base mesh, determining the plurality of fitting points respectively corresponding to the plurality of subdivision points along the dimension of the specific vector to minimize the volume of the space between the subdivision surface obtained by the plurality of fitting points and the surface of the original mesh comprises:

for the plurality of subdivision points corresponding to the triangular face, determining a plurality of fitting points respectively corresponding to the plurality of subdivision points by searching along the dimension of the specific vector, to minimize a volume of a space of a subdivision surface, which corresponds to three vertices of the triangular face and the plurality of fitting points respectively corresponding to the plurality of subdivision points, and a surface of the original mesh, which corresponds to the three vertices of the triangular face.

12. The encoding method of claim 9, wherein encoding the displacement coefficients to obtain the encoded bits and writing the encoded bits into the bitstream comprises:

determining frequency domain displacement coefficients by applying lifting transform to the displacement coefficients;

determining projected displacement coefficients by mapping the frequency domain displacement coefficients to a two-dimensional image through space filling curve; and encoding the projected displacement coefficients to obtain encoded bits and writing the encoded bits into the bitstream.

13. The encoding method of claim 9, wherein determining the reconstructed base mesh of the current image according to the original mesh of the current image comprises:

determining the base mesh of the current image by down-sampling the original mesh of the current image; and determining the reconstructed base mesh by encoding and reconstructing the base mesh.

14. The encoding method of claim 13, further comprising:

encoding the base mesh to obtain encoded bits and writing the encoded bits into the bitstream.

15. The encoding method of claim 9, further comprising:

encoding the value of the first syntax identification information to obtain encoded bits and writing the encoded bits into the bitstream.

16. The encoding method of claim 9, wherein determining the subdivided mesh corresponding to the reconstructed base mesh comprises:

determining mesh subdivision parameters of the current image; and determining the subdivided mesh by performing iterative subdivision on the reconstructed base mesh according to the mesh subdivision parameters.

17. The encoding method of claim 16, wherein the mesh subdivision parameters comprise a subdivision mode and/or a number of subdivisions.

18. The encoding method of claim 17, further comprising:

determining a value of second syntax identification information by parsing the bitstream; and encoding the value of the second syntax identification information to obtain encoded bits and writing the encoded bits into the bitstream.

19. A decoder, comprising:

a processor; and a memory for storing a computer program executable for the processor;

wherein the processor is configured to:

parse a bitstream to determine a reconstructed base mesh of a current image, displacement coefficients and a value of first syntax identification information, wherein the reconstructed base mesh is reconstructed based on an original mesh of the current image;

determine a subdivided mesh according to the base mesh; and apply the displacement coefficients to subdivision points in the subdivided mesh in a dimension of a specific vector to obtain a reconstructed mesh when the value of the first syntax identification information represents single component displacement coding, wherein the specific vector comprises one of a normal vector, a tangent vector, and a bitangent vector, and the displacement coefficients are determined in the dimension of the specific vector by fitting the original mesh of the current image and the subdivided mesh in the dimension of the specific vector.

20. A non-transitory computer-readable storage medium having stored thereon a computer program and a bitstream, wherein the computer program, when executed by a processor, enables the processor to perform the steps of the encoding method of claim 9 to generate the bitstream.

* * * * *